(12) United States Patent
Leufgen

(10) Patent No.: US 8,257,221 B2
(45) Date of Patent: Sep. 4, 2012

(54) METHOD OF OPERATING A HYBRID DRIVE SYSTEM AND HYBRID DRIVE SYSTEM WITH TWO PARTIAL DRIVES

(75) Inventor: Werner Leufgen, Frechen (DE)

(73) Assignee: Fev Motorentechnik GmbH, Aachen (DE)

( * ) Notice: Subject to any disclaimer, the term of this patent is extended or adjusted under 35 U.S.C. 154(b) by 1203 days.

(21) Appl. No.: 12/051,954

(22) Filed: Mar. 20, 2008

(65) Prior Publication Data

US 2008/0234098 A1    Sep. 25, 2008

(30) Foreign Application Priority Data

Mar. 20, 2007   (EP) .................................... 07005675

(51) Int. Cl.
*B60W 10/10* (2006.01)
(52) U.S. Cl. .............................. 477/3; 180/65.23; 477/6
(58) Field of Classification Search .................. 477/3, 6; 74/329; 180/65.23, 65.25
See application file for complete search history.

(56) References Cited

U.S. PATENT DOCUMENTS

| | | | | | |
|---|---|---|---|---|---|
| 5,560,249 | A | * | 10/1996 | Nellums | 74/339 |
| 5,571,058 | A | * | 11/1996 | Schmidt | 475/5 |
| 5,655,990 | A | * | 8/1997 | Ooyama et al. | 477/15 |
| 6,307,276 | B1 | * | 10/2001 | Bader | 290/40 C |
| 6,506,139 | B2 | * | 1/2003 | Hirt et al. | 477/3 |
| 6,612,203 | B2 | * | 9/2003 | Sakamoto et al. | 74/665 A |
| 6,632,155 | B1 | * | 10/2003 | Hohn | 477/3 |
| 6,634,247 | B2 | * | 10/2003 | Pels et al. | 74/329 |
| 6,634,986 | B2 | * | 10/2003 | Kima | 477/107 |
| 6,666,787 | B2 | * | 12/2003 | Doepke | 475/5 |
| 6,695,082 | B2 | * | 2/2004 | Bitsche et al. | 180/65.25 |
| 6,719,654 | B2 | * | 4/2004 | Deichl et al. | 475/5 |
| 6,722,230 | B2 | * | 4/2004 | Sakamoto et al. | 74/661 |
| 6,740,002 | B1 | * | 5/2004 | Stridsberg | 477/14 |
| 6,811,508 | B2 | * | 11/2004 | Tumback | 475/5 |
| 6,852,054 | B2 | * | 2/2005 | Tumback et al. | 475/5 |
| 6,881,169 | B2 | * | 4/2005 | Katakura | 477/3 |
| 6,887,180 | B2 | * | 5/2005 | Pels et al. | 477/3 |
| 6,896,635 | B2 | * | 5/2005 | Tumback | 475/5 |
| 6,976,934 | B2 | * | 12/2005 | Komeda et al. | 477/5 |
| 7,082,850 | B2 | * | 8/2006 | Hughes | 74/329 |
| 7,108,087 | B2 | * | 9/2006 | Imai | 180/65.23 |
| 7,125,362 | B2 | * | 10/2006 | Beaty et al. | 477/3 |
| 7,246,672 | B2 | * | 7/2007 | Shirai et al. | 180/65.25 |
| 7,497,803 | B2 | * | 3/2009 | Sah et al. | 477/3 |
| 7,540,823 | B2 | * | 6/2009 | Kilian et al. | 477/3 |
| 7,581,461 | B2 | * | 9/2009 | Matsushita | 74/333 |
| 7,604,565 | B2 | * | 10/2009 | Lee et al. | 477/3 |
| 7,625,311 | B2 | * | 12/2009 | Dilzer | 477/5 |
| 7,735,389 | B2 | * | 6/2010 | Komori | 74/340 |
| 7,988,594 | B2 | * | 8/2011 | Heap et al. | 477/3 |
| 2002/0033059 | A1 | * | 3/2002 | Pels et al. | 74/329 |
| 2006/0021456 | A1 | * | 2/2006 | Hughes | 74/340 |
| 2010/0203996 | A1 | * | 8/2010 | Kawai et al. | 475/5 |
| 2010/0234173 | A1 | * | 9/2010 | Miyazaki et al. | 477/5 |

(Continued)

FOREIGN PATENT DOCUMENTS

DE    19850549    5/2000

(Continued)

*Primary Examiner* — Jeffrey J Restifo
(74) *Attorney, Agent, or Firm* — Gifford, Krass, Sprinkle, Anderson & Citkowski, P.C.

(57) ABSTRACT

A method of operating a hybrid drive system with an internal combustion engine and a supplemental electric machine for a motor vehicle including first and second gear changing partial drives each with gear changing gearwheels, wherein during operation there is torque flow from one gear changing partial drive to the other partial drive results in a gear change between gearwheels.

14 Claims, 37 Drawing Sheets

U.S. PATENT DOCUMENTS

2010/0234174 A1 * 9/2010 Miyazaki et al. .................. 477/5

FOREIGN PATENT DOCUMENTS

| | | |
|---|---|---|
| EP | 1559603 | 8/2005 |
| EP | 1610038 | 12/2005 |
| FR | 2805221 | 8/2001 |
| FR | 2811395 | 1/2002 |
| FR | 2835301 | 8/2003 |
| WO | WO-03/100298 | 12/2003 |
| WO | WO-2005/065976 | 7/2005 |

* cited by examiner

METHOD OF OPERATING A HYBRID DRIVE SYSTEM AND HYBRID DRIVE SYSTEM WITH TWO PARTIAL DRIVES

CROSS-REFERENCE TO RELATED APPLICATIONS

This application claims priority of European Patent Application No. EP07005675.9 filed Mar. 20, 2007.

FIELD OF THE INVENTION

The invention relates to a method of operating a hybrid drive system and to a hybrid drive system with a main driving machine, more particularly an internal combustion engine, and a supplementary driving machine, more particularly an electric machine, for a motor vehicle. Other types of driving machines are not excluded. For example, it is possible to provide two electric machines as the main driving machine and the supplementary driving machine or, in addition to an internal combustion engine as the main driving machine, a hydraulic machine as the supplementary driving machine.

BACKGROUND OF THE INVENTION

Vehicles with a hybrid drive system in the different embodiments have, in certain driving cycles, a more advantageous exhaust gas behaviour than vehicles which are driven entirely by an internal combustion engine. They therefore become more and more important on the market.

If an electric machine is used as the supplementary driving machine, it can be used as an engine and a generator. As far as the engine function is concerned, wherein it is necessary to provide a battery for power supply purposes, it is possible to use it to start an internal combustion engine or to use it as a driving motor. When used as a generator, the electric machine is used for charging the battery, wherein the energy is obtained from the internal combustion engine or from the recovery of the kinetic vehicle energy.

Hybrid drive systems are described for example in WO 2005/073005 A1, DE 100 49 514 A1 and DE 198 18 108 A1.

From DE 199 60 621 A1 there is known a hybrid drive for vehicles with a manual gearbox which comprises a first switchable partial drive which, optionally, can be connected in respect of drive to an internal combustion engine and/or an electric machine, as well as a second switchable partial drive which, in respect of drive, can be connected to the electric machine which can be operated as an electric motor or a generator. The first partial drive comprises a first lay-shaft and an output shaft as well as six transmission stages; the second partial drive comprises a second lay-shaft and the same output shaft and comprises three transmission stages.

SUMMARY OF THE INVENTION

It is therefore the object of the present invention to provide a method of operating a hybrid drive system which allows a simplified design, as well as a hybrid drive system which is characterised by a simplified design relative to the number of available transmission stages. More particularly it is desirable to provide a compact design for transverse installation in motor vehicles.

The objective is achieved by providing a method of operating a hybrid drive system with a main driving machine—more particularly an internal combustion engine—and a supplementary driving machine—more particularly an electric machine—for a motor vehicle, comprising a first gear changing partial drive with an input shaft and an output shaft and a first group of gear changing pairs of gearwheels each having a gearwheel connected in a rotationally fast way to its shaft and a switching gearwheel which can be switcbably coupled to its shaft and whose input shaft can be coupled to the main driving machine;

a second gear changing partial drive with an input shaft and an output shaft and a second group of gear changing pairs of gearwheels each having a gearwheel connected in a rotationally fast way to its shaft and a switching gearwheel which can be switchably coupled to its shaft and whose input shaft can be connected in respect of drive to the supplementary driving machine;

wherein the two input shafts can be connected to one another in a rotationally fast way via a coupling unit, wherein, during operation by means of the main driving machine only, there is effected a gear change between two gears adjoining one another in the gear changing sequence, by changing the torque flow from one gear changing partial drive to the other gear changing partial drive.

Furthermore it is proposed according to a preferred embodiment that, during operation by means of the supplementary driving machine only there is effected a gear change between two gears adjoining one another in the gear changing sequence, by changing the torque flow from one gear changing partial drive to the other gear changing partial drive. In this way it is possible to reduce the number of gear changing pairs of gearwheels in both gear changing partial drives, combined, to the number of required gears.

Furthermore, the objective is achieved by providing a hybrid drive system with a main driving machine—more particularly an internal combustion engine—and a supplementary driving machine—more particularly an electric machine—for a motor vehicle, comprising a first gear changing partial drive with an input shaft and an output shaft and a first group of gear changing pairs of gearwheels each having a gearwheel connected in a rotationally fast way to its shaft and a switching gearwheel which can be switchably coupled to its shaft and whose input shaft can be coupled to the main driving machine;

a second gear changing partial drive with an input shaft and an output shaft and a second group of gear changing pairs of gearwheels each having a gearwheel connected in a rotationally fast way to its shaft and a switching gearwheel which can be switchably coupled to its shaft and whose input shaft is connectable in respect of drive to the supplementary driving machine;

wherein the pairs of gear changing gearwheels, in the gear changing sequence, are alternately associated with one of the gear changing partial drives and wherein the two input shafts can be connected to one another in a rotationally fast way via a coupling unit.

The essential part of the solution consists in providing the drive in the form of two partial drives whose gear stages are distributed so as to alternate, i.e. the first, the third and the fifth gear are associated with the partial drive which is connectable to the main driving machine, i.e. the internal combustion engine, and the second, the fourth and the sixth gear are associated with the partial drive which is firmly connected to the supplementary driving machine, i.e. the electric machine.

The first gear is thus available for starting by means of the internal combustion engine and for starting electrically, there is available the first gear or the second gear. If the two input shafts are firmly connected to one another, it is possible to use gears one to six, and optionally, a reverse gear when using the internal combustion engine. In such a case, in gears one, three and five, the electric machine can remain disconnected from the drive and in gears two, four and six, the electric machine can remain torque-free. Furthermore, if the two input shafts are firmly coupled, when operating with the electric motor, it is possible to use gears one to six for gear changing purposes, while the internal combustion engine is disconnected by the friction coupling. When the input shafts are disconnected, gears two, four and six are available for driving the vehicle by the electric motor only. By coupling the two input shafts (gears two, four and six) and, respectively, by disconnecting the two input shafts (gears one, three and five) a boost operation is possible in all gears, i.e. operation by internal combustion engine with an additional electric drive.

By selecting an appropriate sequence of opening and closing the friction coupling of the internal combustion engine and the coupling unit between the two input shafts, followed by a suitably adapted sequence of operating the switching units for the different gears, a traction-force-interruption-free method of switching between the gears is possible. Prior to switching the coupling unit, it is advisable to synchronise the speeds of the input shafts. A decisive feature of this kind of operation is that with the inventive drive assembly, the element to be switched (manual clutch, switching unit) can always be disconnected, while at least one drive, either the electric machine or the internal combustion engine remains in a torque transmitting connection with the drive output, i.e. with an output gearwheel. During the switching process, the speeds of the elements to be switched can be adapted by controlling the electric machine and the internal combustion engine, so that at least said coupling unit for connecting the two input shafts can be provided in the form of a simple switching coupling (synchronising unit). The friction coupling of the internal combustion engine permits a slipping connection of the internal combustion engine, such as it is common practice.

Due to the inventive arrangement of the electric machine and the internal combustion engine, torque will be added up when both machines are operated. As will be explained below, it is possible to use the electric motor for starting purposes and to operate it as a generator in a recuperation mode.

The drive system is designed in such a way that under full load conditions and under permanent load conditions, only the internal combustion engine is used. However, the desired functions of a hybrid drive have been put into effect at low cost and without any limitations.

According to an advantageous first embodiment which permits a radial compact design it is proposed that both input shafts are arranged coaxially, especially in-line with one another, and are connectable to one another by a coaxially arranged coupling unit. More particularly, it is proposed that the two output shafts are in-line with one another and integrally connected to one another.

According to a second design embodiment which permits a short length for a transverse installation in the motor vehicle it is proposed that the two input shafts are arranged parallel to one another and that the coupling unit is arranged coaxially on one of the input shafts and acts on a switching gear wheel which is arranged on said input shaft and which forms a pair of gearwheels with a gearwheel firmly arranged on the other input shaft. Furthermore, it is proposed that the two output shafts are arranged so as to extend parallel to their input shaft and are each coupled by fixed gears to an individual output gear.

According to a third design embodiment which permits a short length for a transverse installation in the motor vehicle too it is proposed that the two input shafts are arranged parallel to one another and that the coupling unit is arranged coaxially on one of the input shafts and acts on a switching gear wheel which is arranged on said input shaft and which forms a geartrain with a gearwheel firmly arranged on the other input shaft. This geartrain especially can comprise an intermediate gearwheel being firmly connected to the supplementary driving machine. Furthermore, it is proposed that the two output shafts form one integral shaft member.

Further advantageous embodiments are described in the sub-claims to the contents of which reference is hereby made.

BRIEF DESCRIPTION OF THE DRAWINGS

The different operating conditions which, above, were indicated only, are described in greater detail in the following description of the drawings.

Three preferred embodiments of the invention are illustrated in the drawings and will be described below.

DETAILED DESCRIPTION OF THE PREFERRED EMBODIMENTS

Figure 1:
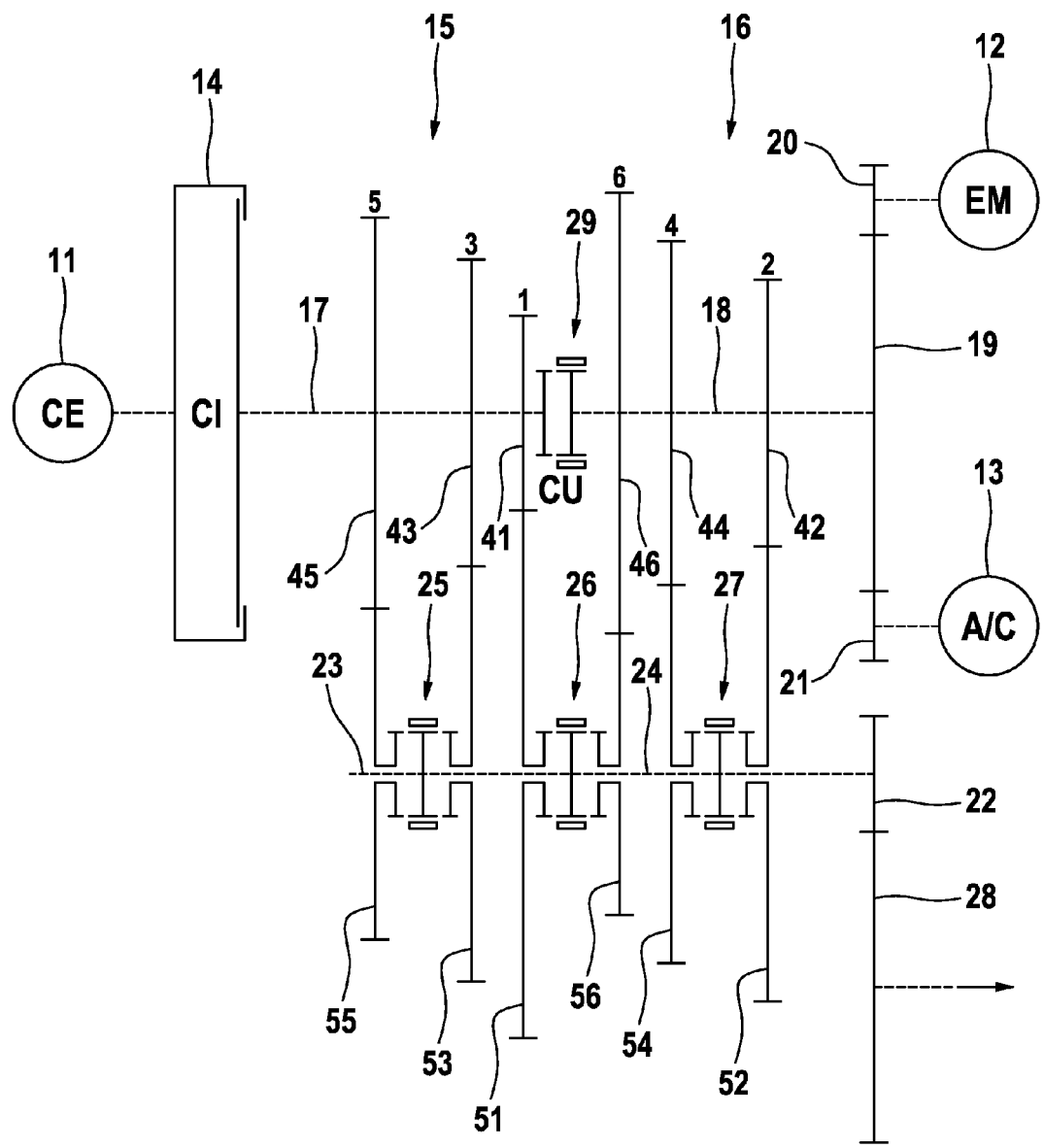
FIG. 1 shows the drive concept of an inventive hybrid drive system in a first embodiment in a three-shaft-design in a neutral position.

FIG. 1 shows an inventive hybrid drive system in a first embodiment. The subsequent description of FIG. 1, in principle, also applies to FIGS. 2 to 8 which merely show different switching conditions of the drive concept.

There is shown a hybrid drive system which comprises a main driving machine 11, here in the form of an internal combustion engine CE, a supplementary driving machine 12, here in the form of an electric machine EM, and an auxiliary driven machine 13, here in the form of a compressor for an air conditioning system A/C. The internal combustion engine 11 is connectable by a friction clutch 14 (Cl) which can be provided in the form of a wet or dry clutch. The drive comprises two gear changing partial drives 15, 16 (stepped gear changing boxes) which are characterised in that they each comprise their own input shafts 17 and 18. The input shaft 17 of the first partial drive carries the gearwheels of gears 1, 3 and 5 and is connectable by the friction clutch 14 to the internal combustion engine 11. The input shaft 18 of the second partial drive 16 carries the gearwheels of gears 2, 4 and 6 as well as an input gearwheel 19 which, by means of a gearwheel 20, is in a stepped down driving connection with the electric machine 12 and, by means of a gearwheel 21, with the air conditioning compressor 13. In this embodiment, the output shafts 23, 24 of the two partial drives 15, 16 are firmly connected to one another; more particularly, they are provided in the form of a one-piece shaft. The switching gearwheels of the individual gears are positioned on the output shaft 23, 24, and there is provided a common switching unit 25 for gears 3 and 5 and a further common switching unit 26 for gears 1 and 6, as well as a switching unit 27 for gears 2 and 4. This concept does not include a reverse gear. Reversing can take place by reversing the direction of rotation of the electric machine 12. In addition, by using a reversing gearwheel on an intermediate shaft and a further switching unit, it is also possible to reverse the vehicle in the usual way when it is operated by the internal combustion engine 11. The output shaft 23, 24 acts via a gearwheel 22 on an output gearwheel 28 of the drive, from which output can be taken. Between the input shafts 17, 18, in accordance with the invention, there is arranged a coupling unit CU which, more particularly if the speeds of the two input shafts are synchronised, can be switched so as to be suitable for various operating conditions which will be described below with reference to further figures.

The fixed gearwheels of gears 1 to 6 which are arranged in a rotationally fast way on the input shafts 17, 18 have been given in the gear sequence the reference numbers 41, 42, 43, 44, 45, 46, and the respective switching gearwheels which are loose gearwheels suitable for being coupled to the output shafts 23, 24, have been given in the gear sequence the reference numbers 51, 52, 53, 54, 55 each in FIG. 1 only. The fixed gearwheels and the loose gearwheels could also be interchanged between the input and output shafts.

Figure 2:
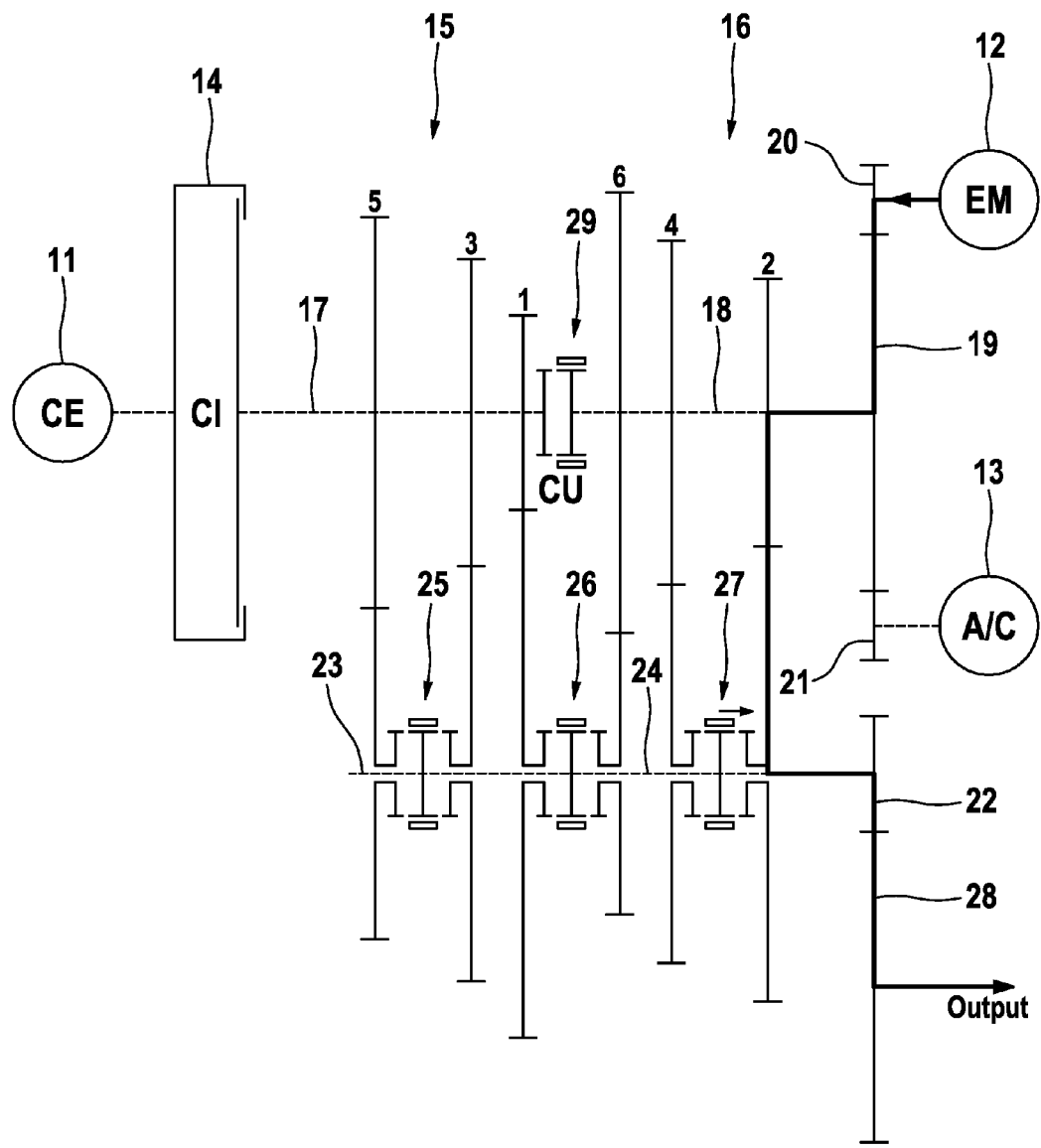
FIG. 2 shows the drive concept according to FIG. 1 when starting and driving the motor vehicle, using the electric machine EM.

In FIG. 2, the coupling unit 29 is disengaged, so that the input shafts 17, 18 are separated from one another. Of the drive gears, only the second gear is engaged by the switching unit 27. In this switched condition, electric starting the vehicle—depending on the direction of rotation for forward driving or reversing—can be effected by the electric machine, with driving the vehicle also being possible with the electric machine. It is conceivable to change up into the fourth or sixth gear, in which case the traction force would be interrupted. A darker line indicates the torque flow from the electric machine 12 to the output gearwheel 28.

The following switched conditions apply:
torque from EM
clutch Cl open
coupling CU disengaged
second gear engaged.

Figure 3:
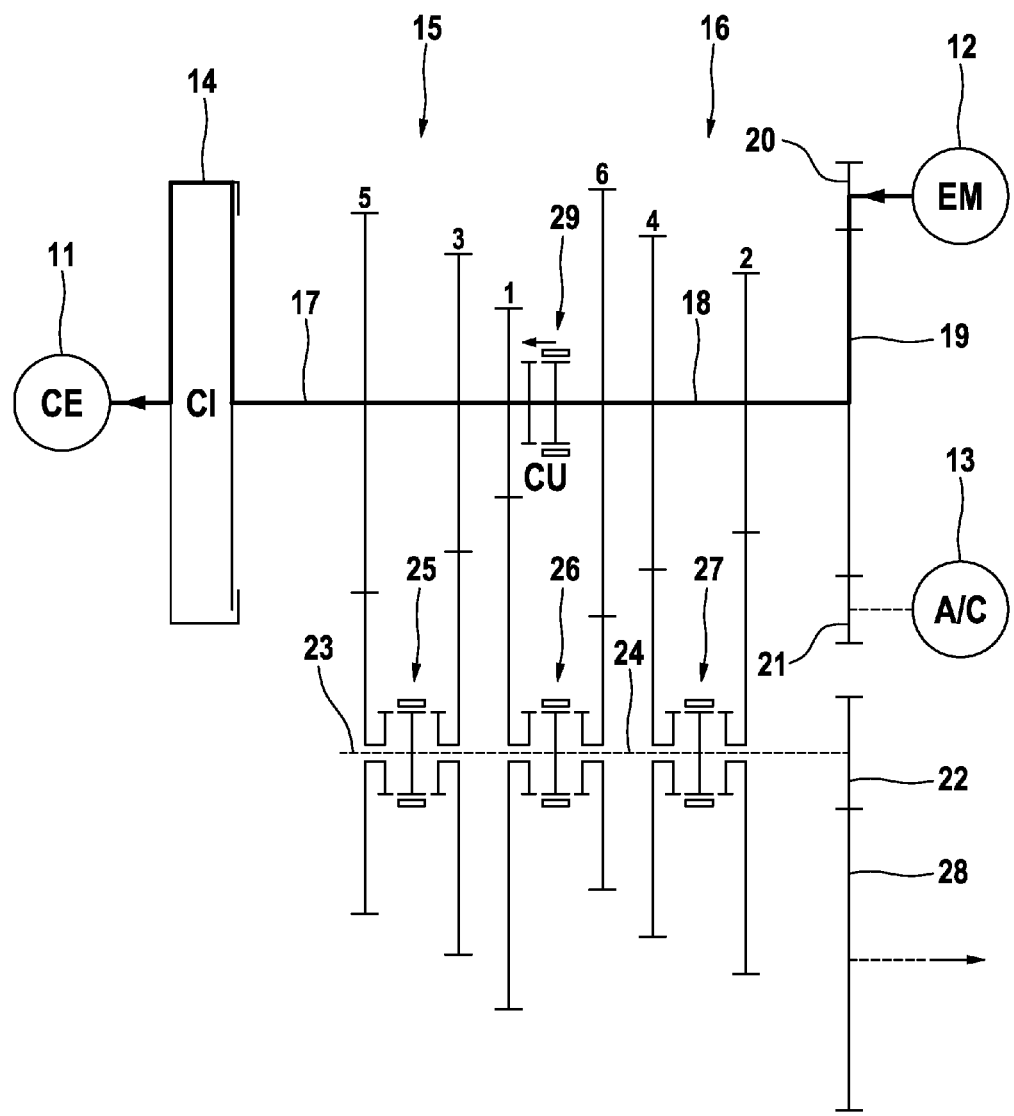
FIG. 3 shows the drive concept according to FIG. 1 when starting the internal combustion engine CE by the electric machine EM in the stationary condition of the vehicle.

FIG. 3 shows the electric machine 12 in the starter function for the internal combustion engine. For this purpose, the coupling unit 29 is engaged and the function clutch 14 is closed. All gears are disengaged by the switching units 25, 26, 27. A darker line shows the torque flow from the electric machine 12 to the internal combustion engine.

The following switched conditions apply:
torque flow from the electric machine EM
coupling unit CU engaged
clutch Cl closed
starting of the internal combustion engine CE.

Figure 4:
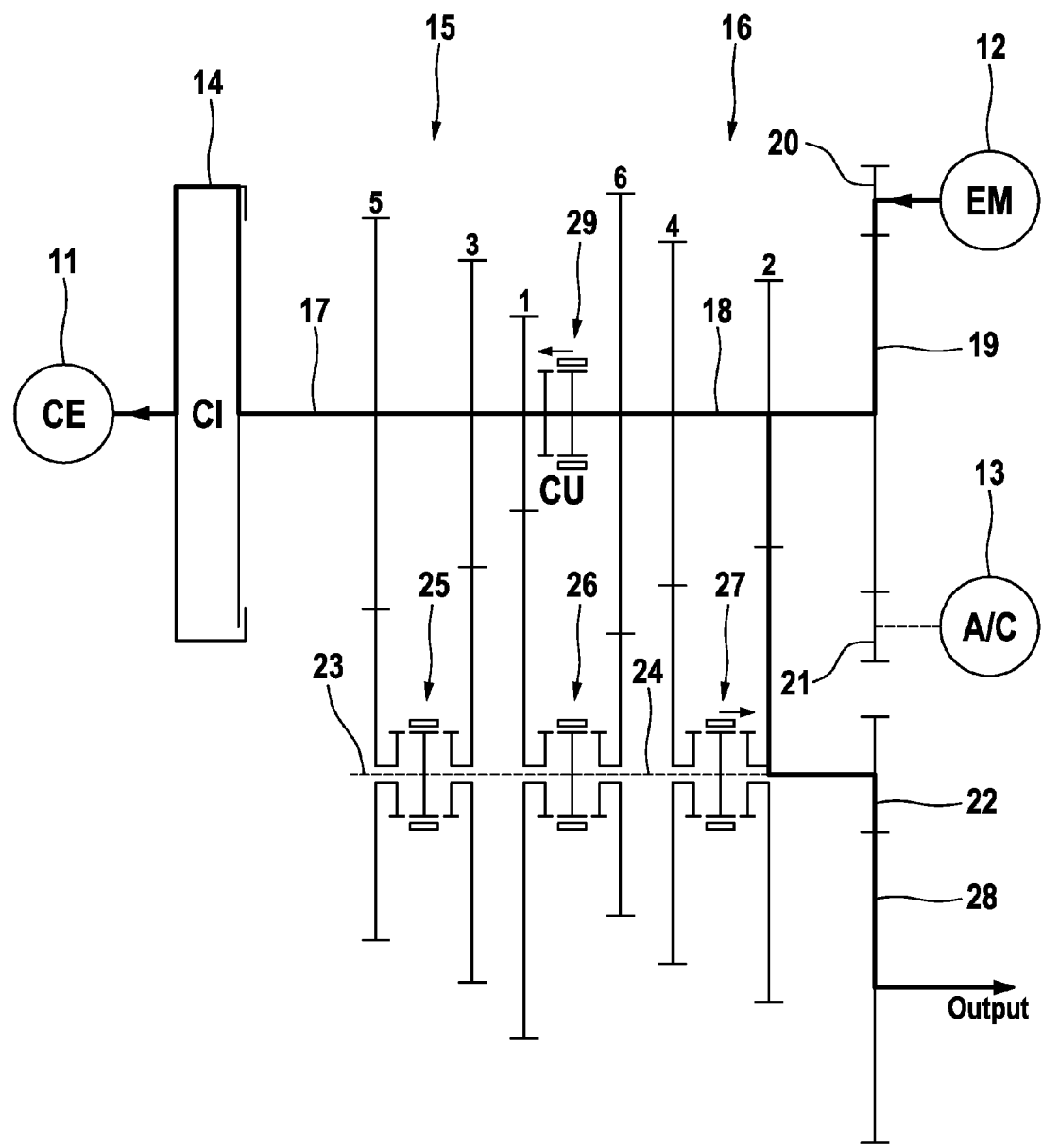
FIG. 4 shows the drive concept according to FIG. 1 when starting the internal combustion engine CE by the electric motor EM while the vehicle is driven electrically.

FIG. 4 shows the internal combustion engine 11 being started by the electric machine during electric driving of the vehicle. The second gear is engaged by the switching unit 27, so that torque flows from the electric machine 12 via the pair of gearwheels of the second gear to the output gearwheel 28 of the drive, whereas at the same time the coupling unit 29 is engaged and the friction clutch 14 is closed in order to start the internal combustion engine 11 in the torque flow via the two input shafts 18, 17 and the friction clutch 14. Dark lines show the torque flow from the electric machine 12 to the internal combustion engine 11 and to the output gearwheel 28.

The following switched conditions apply:
torque from the electric machine EM
switching unit CU engaged
clutch Cl closed
second gear engaged.

The illustrations of FIG. 5 show different phases of changing up from the second into the third gear.

Figure 5A:
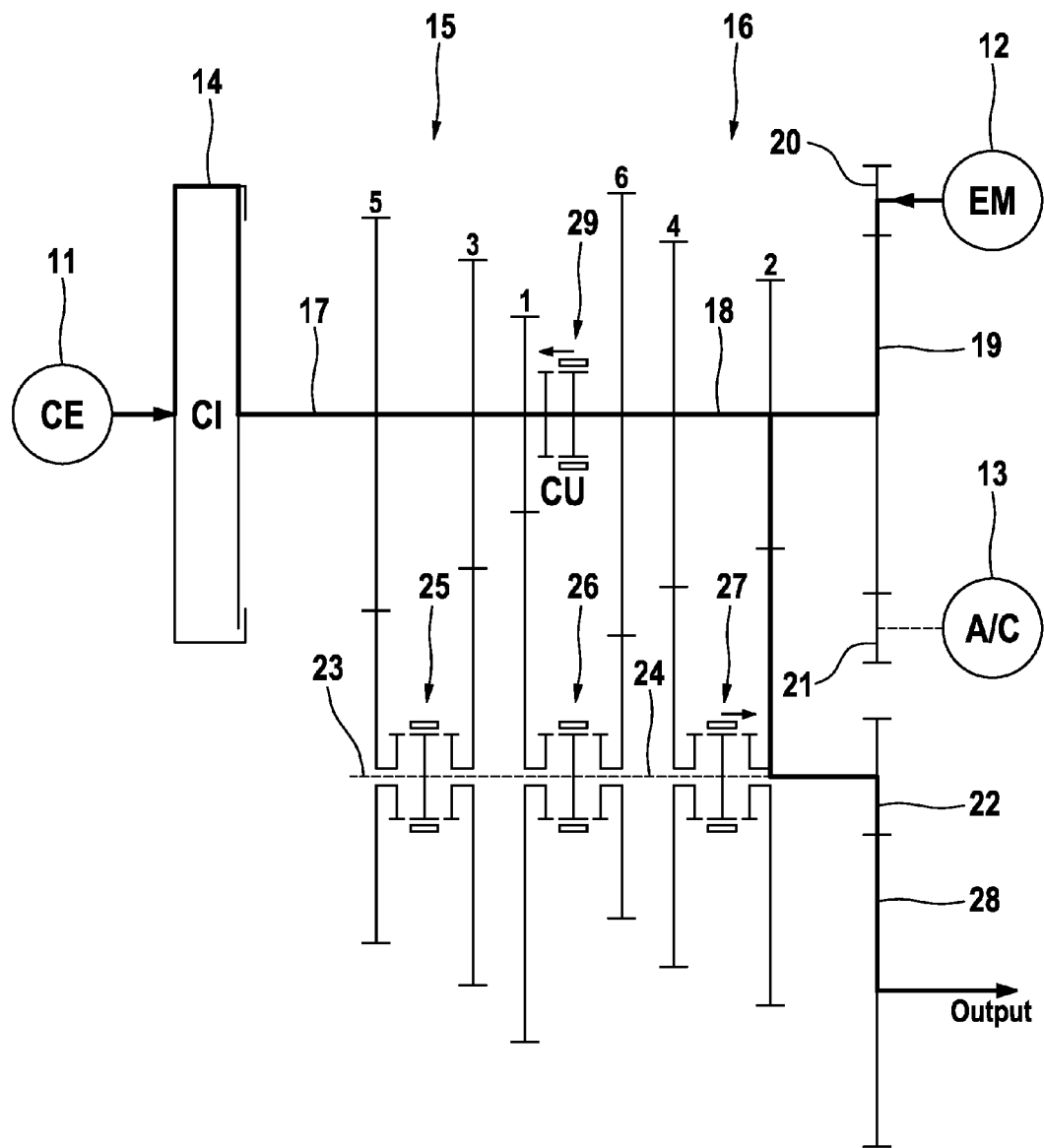
FIG. 5a shows the drive concept according to FIG. 1 when changing up from the second gear to the third gear during a first phase and during the boost mode.

In FIG. 5a the friction clutch 14 is closed and the coupling unit 29 is engaged. Furthermore, the second gear is engaged by the switching unit 27. Torque flows from the internal combustion engine 11 via the input shafts 17, 18 and the pair of gearwheels of the second gear to the output shaft 23, 24, so that the vehicle can be driven by the internal combustion engine. There is indicated an additional torque flow from the electric machine via the pair of gearwheels 20, 19 to the input shaft 13. This is the so-called boost mode in which additional torque is applied by the electric machine. The latter could also run in a torque-free condition. However, in the present case, the boost mode forms part of the switching process which follows. Covered lines indicate the torque flow from the internal combustion engine 11 and from the electric machine to the output gearwheel 28.

The following switched conditions apply:
torque from the internal combustion engine CE
clutch Cl closed
coupling unit CU engaged
additional torque from the electric machine EM
second gear engaged.

Figure 5B:
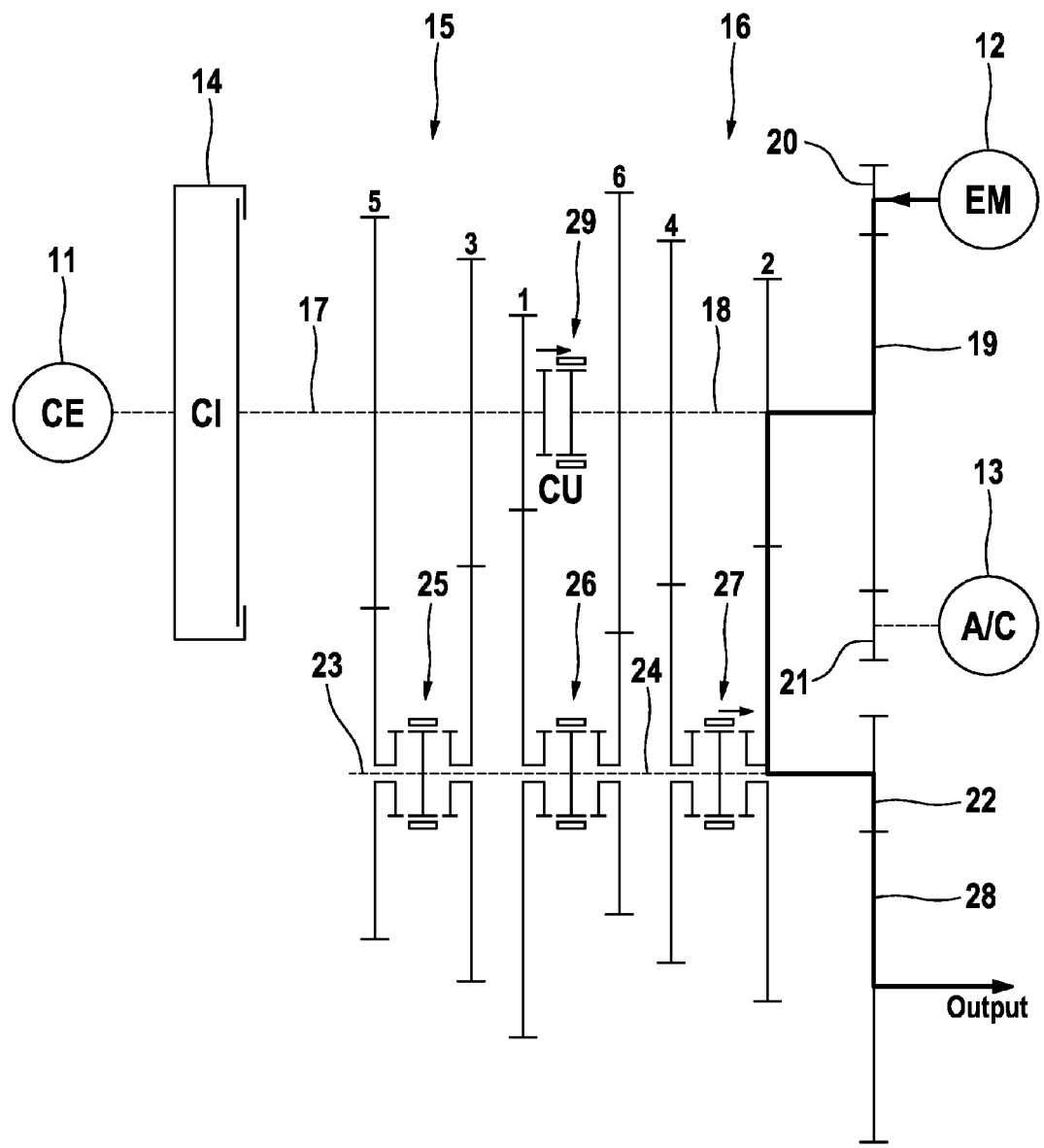
FIG. 5b shows the drive concept according to FIG. 1 when changing up from the second gear to the third gear during a second phase.

In FIG. 5b, the second gear is still engaged, but the friction clutch 14 is opened in order to separate the internal combustion engine 11 from the input shaft 17 and render it torque-free. Hereafter, the coupling unit 29 is disengaged in order to separate the input shaft 18 driven by the electric machine 12 from the input shaft 17. A thickened line indicates the torque flow from the electric machine to the output gearwheel 28.

The following switched conditions apply:
torque from the electric machine EM
clutch Cl open
coupling unit CU disengaged
second gear engaged.

Figure 5C:
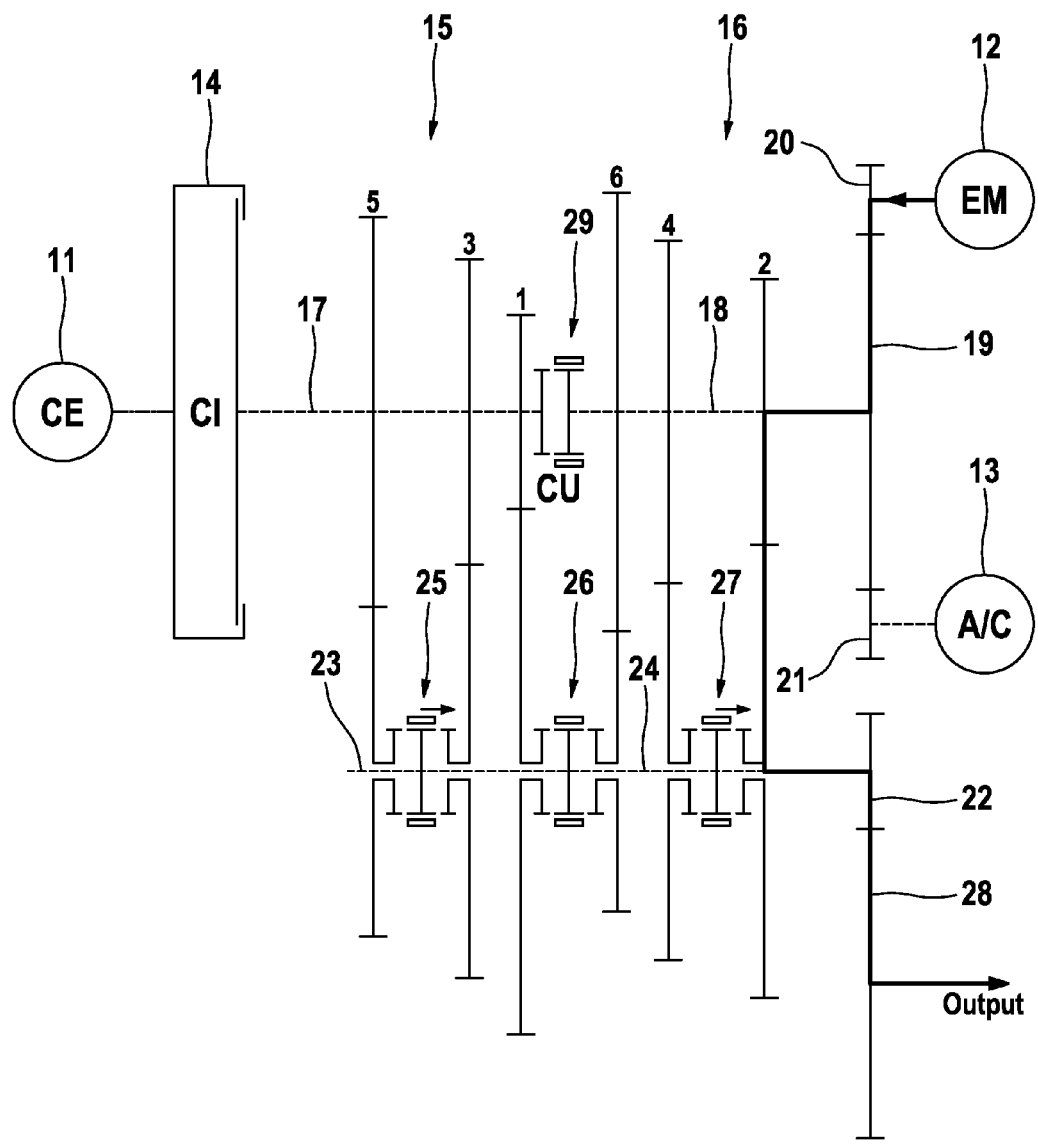
FIG. 5c shows the drive concept according to FIG. 1 when changing up from the second gear to the third gear during a third phase.

FIG. 5c shows that the second gear continues to be engaged by the switching unit 27, but at the same time, the third gear is engaged by the switching unit 25. The input shaft 17 continues to be torque-free because the friction clutch 14 continues to be open. The torque flow takes place from the electric machine 12 via the fixed connection of the shafts 18, 24 to the output gearwheel 28.

The switched conditions are as follows:
torque from the electric machine EM
clutch Cl open
coupling unit CU disengaged
second gear still engaged
third gear already engaged.

Figure 5D:
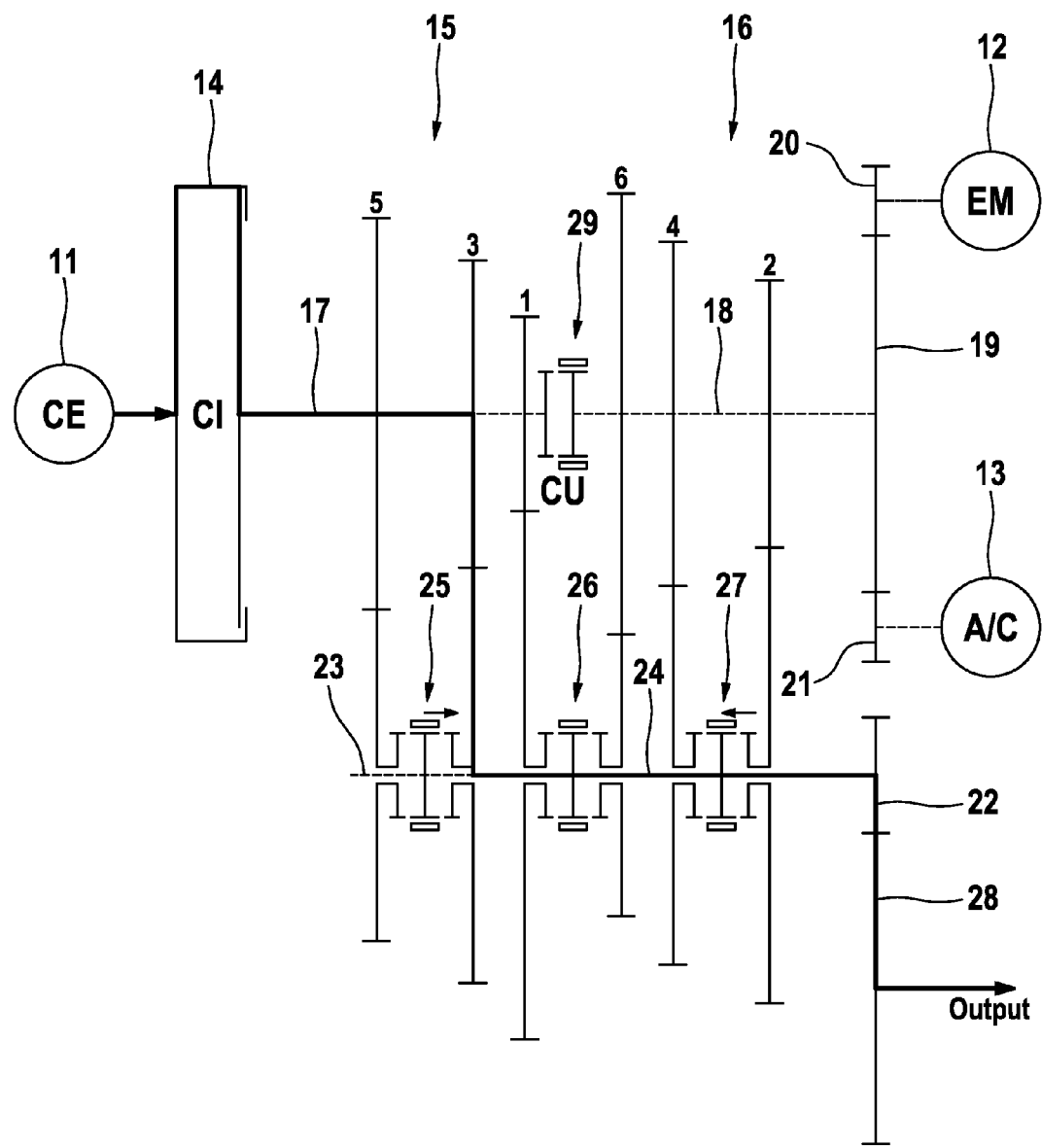
FIG. 5d shows the drive concept according to FIG. 1 when changing up from the second gear to the third gear during a fourth phase.

FIG. 5d shows how the switching process is concluded in that the second gear is disengaged by the switching unit 27, whereas at the same time, by closing the friction clutch 14, the gearwheels of the already engaged third gear are incorporated in the torque flow from the internal combustion engine 11 via the input shaft 17 into the torque flow to the output shaft and to the output gearwheel 28. A thickened line indicates the torque flow from the internal combustion engine to the output gearwheel 28.

The switched conditions are as follows:
torque from the internal combustion engine CE,
clutch Cl closed
coupling unit CU disengaged
second gear disengaged
third gear engaged.

The individual illustrations of FIG. 6 show different phases of changing down from the third to the second gear.

Figure 6A:
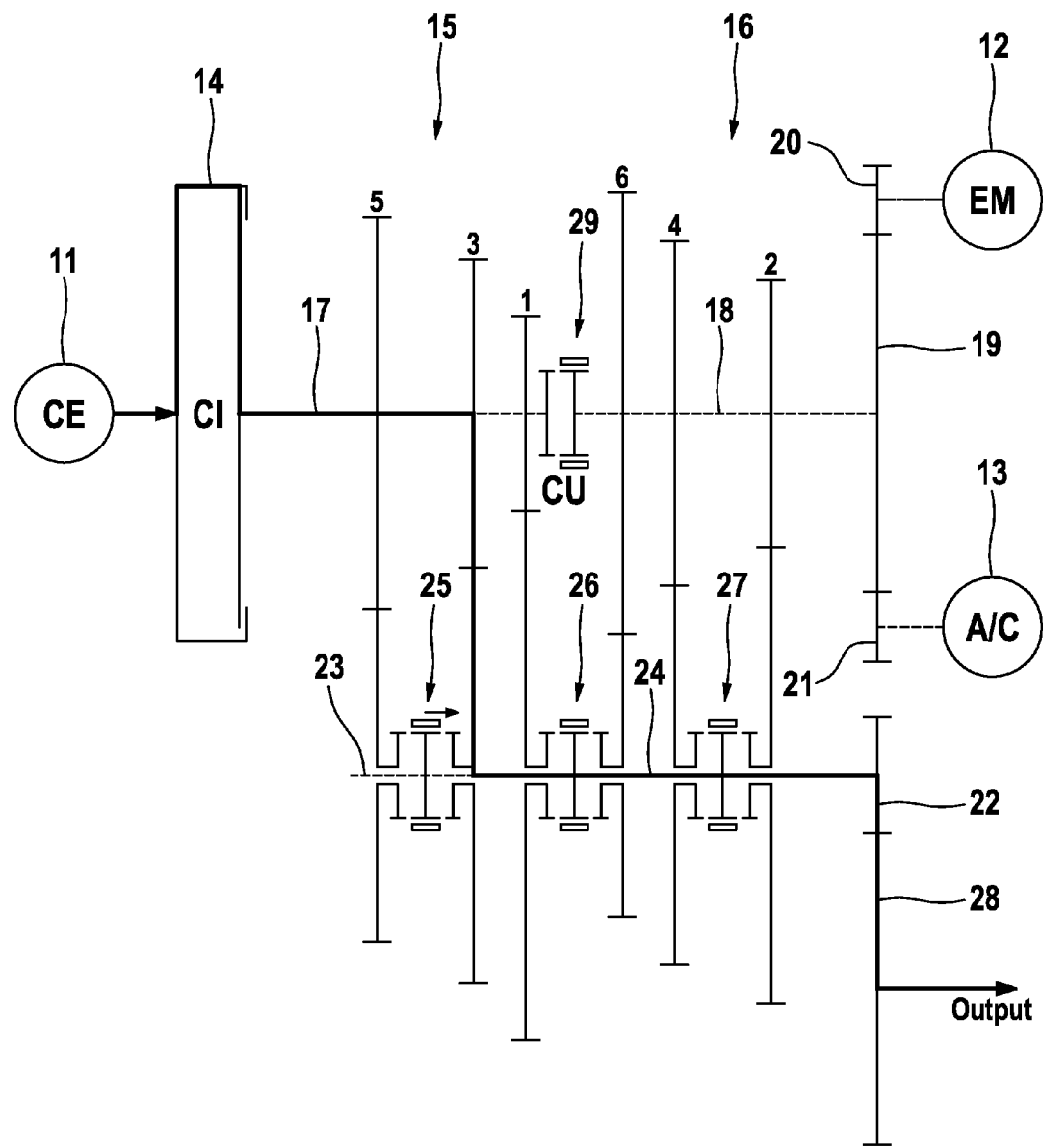
FIG. 6a shows the drive concept according to FIG. 1 when changing down from the third gear to the second gear during a first phase.

In FIG. 6a, the friction clutch 14 is closed and the coupling unit 29 is disengaged, so that the input shafts 17, 18 are separated from one another. The switching unit 25 couples the switching gearwheel of the third gear to the output shaft 23, i.e. the third gear is engaged. Torque flows from the internal combustion engine 11 via the input shaft 17 and the pair of gearwheels of the third gear to the output shafts 23, 24 and to the output gearwheel 28. The thickened line symbolises the torque flow from the internal combustion engine 11 to the output gearwheel 28.

The switched conditions are as follows:
torque from the internal combustion engine CE
friction clutch Cl closed
coupling unit CU disengaged
third gear engaged.

Figure 6B:
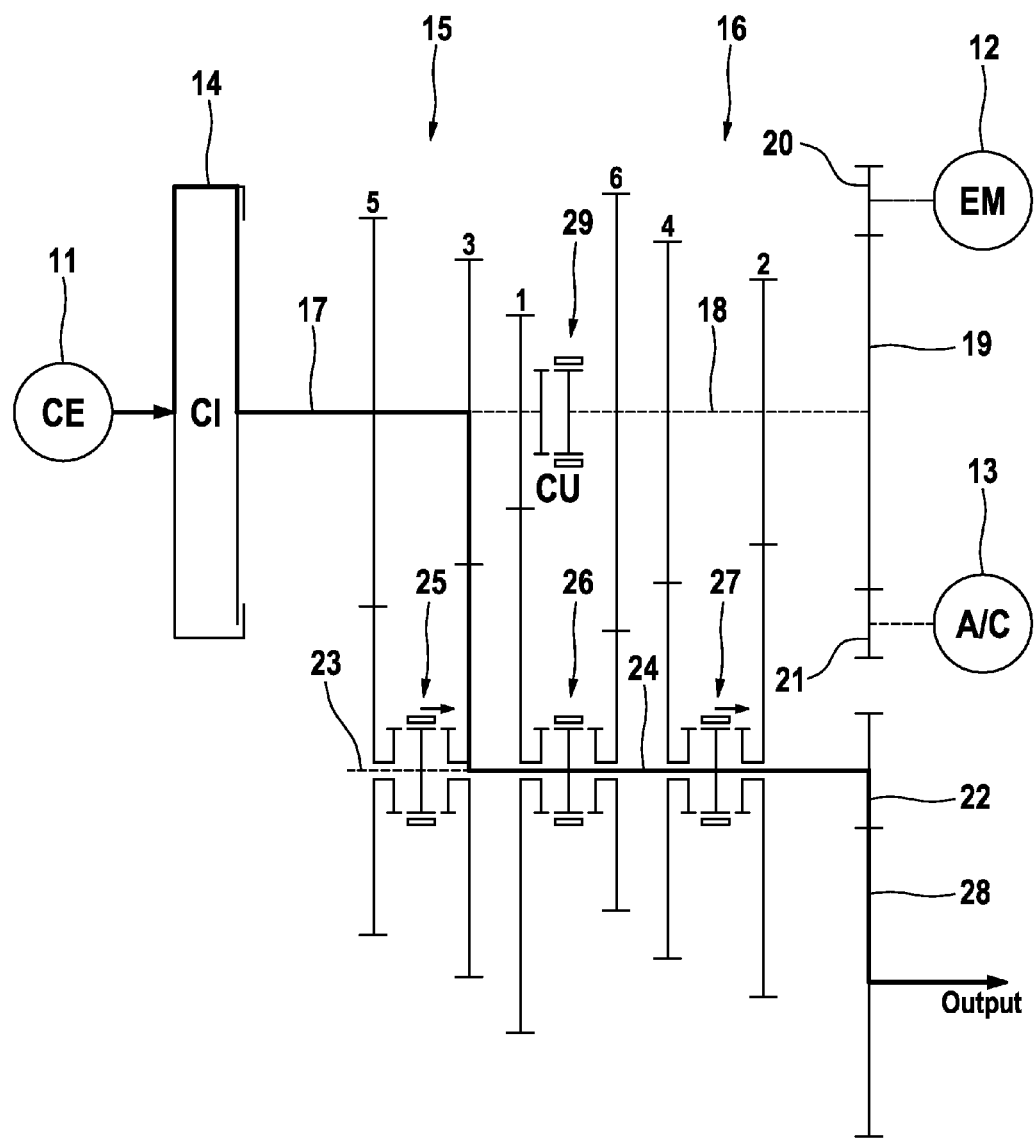
FIG. 6b shows the drive concept according to FIG. 1 when changing down from the third gear to the second gear during a second phase.

FIG. 6b shows that for preparing the gear change, the second gear is engaged by means of the switching unit 27, with no torque flowing yet via the pair of gearwheels of the second gear because the coupling unit 29 continues to be open, with the input shaft 18 being disconnected from the input shaft 17. The electric machine 12 thus does not receive any power. The thickened line symbolises the torque flow from the internal combustion engine 11 to the output gearwheel 28.

The switched conditions are as follows:
torque from the internal combustion engine CE,
friction clutch Cl closed
coupling unit CU disengaged
third gear engaged
second gear engaged.

Figure 6C:
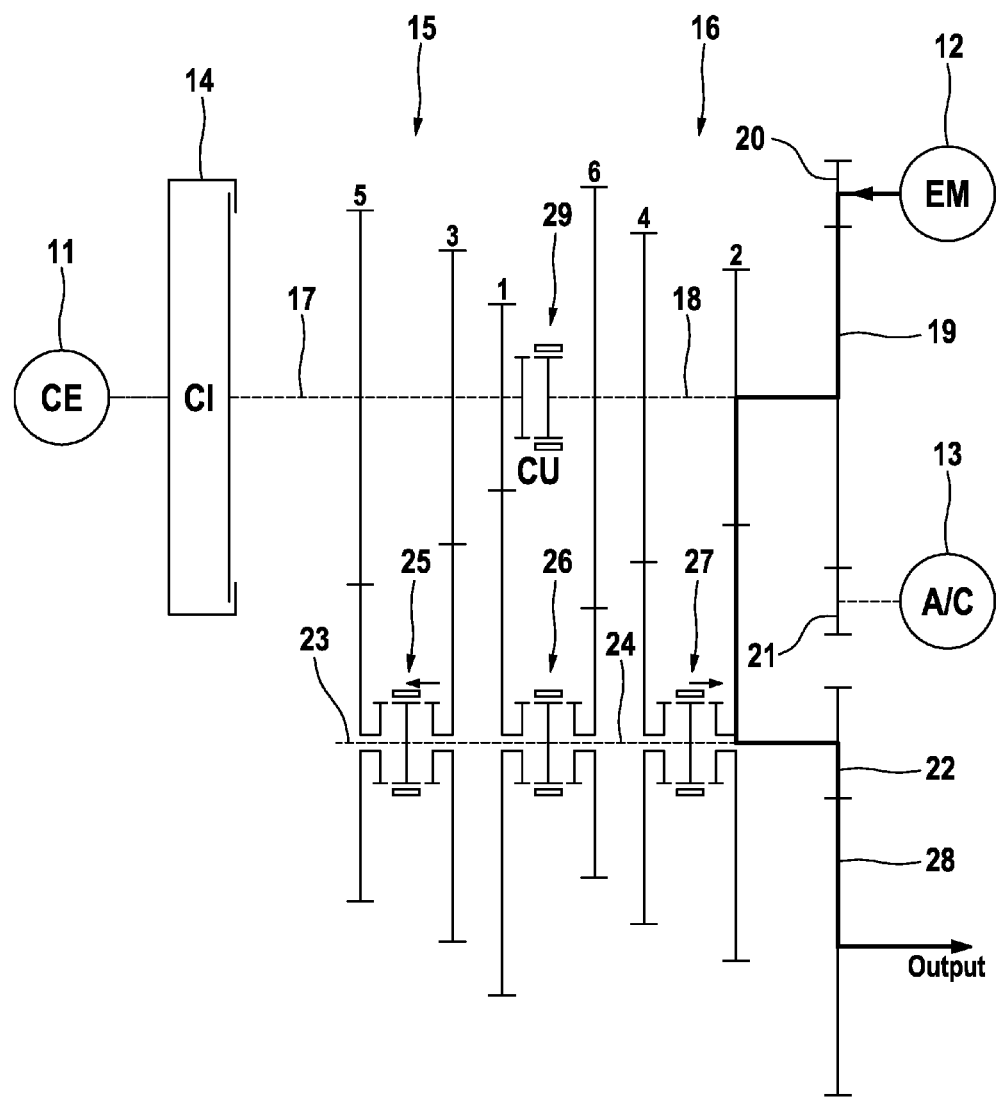
FIG. 6c shows the drive concept according to FIG. 1 when changing down from the third gear to the second gear during a third phase.
Figure 6D:
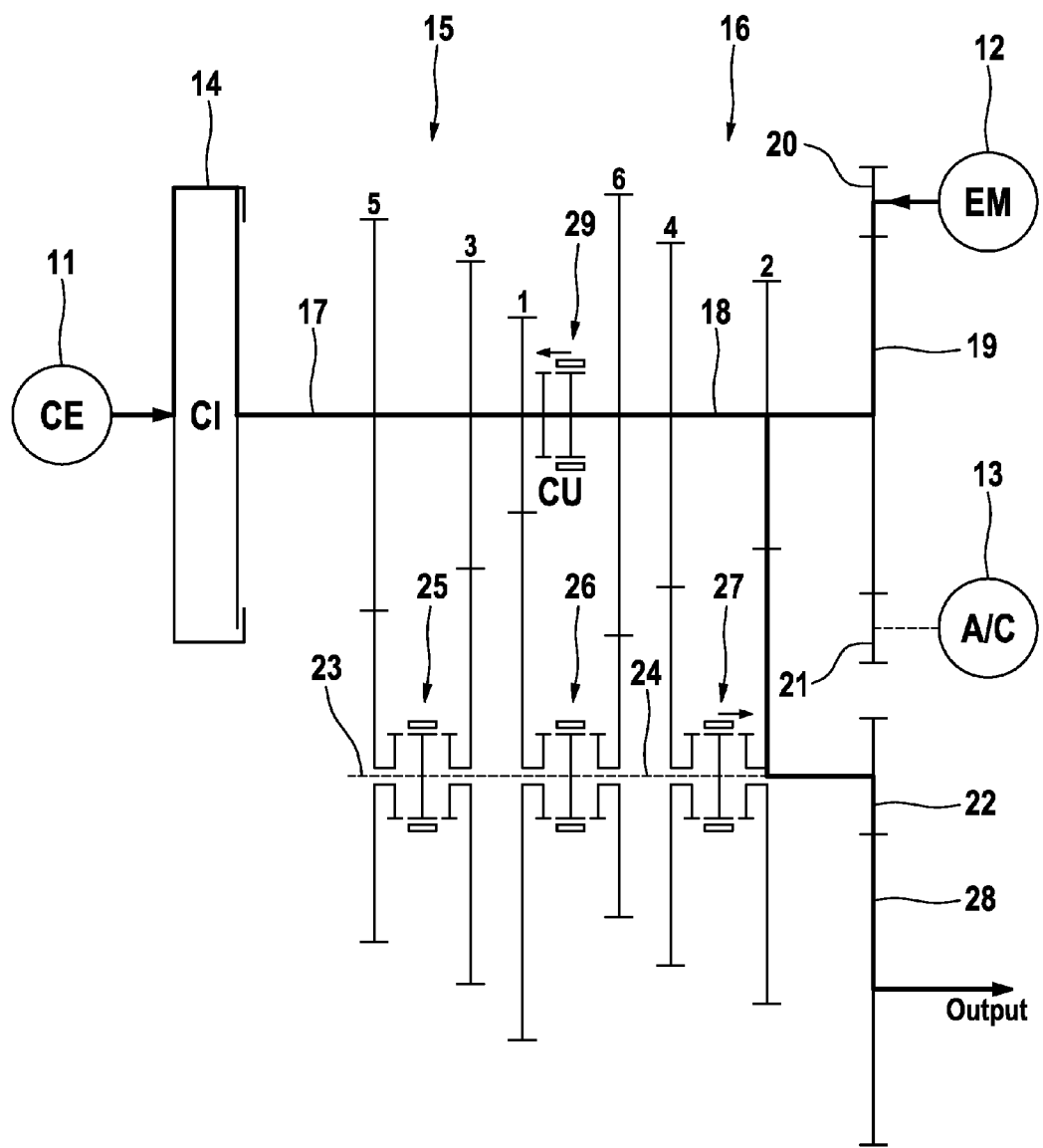
FIG. 6d shows the drive concept according to FIG. 1 when changing down from the third gear to the second gear in a fourth phase and in the boost mode.

In FIG. 6c, the friction clutch 14 is now open, so that the input shaft 17 is separated from the torque flow. The electric machine 12, whose speed has already been synchronised, now takes over the torque for driving the vehicle in the second gear. The switching gearwheel of the third gear, which is torque-free, is separated by the switching unit 25 from the output shaft 23. The thickened line symbolises the torque flow from the electric machine 12 to the output gearwheel 28.

The switched conditions are as follows:
friction clutch Cl open
coupling unit CU disengaged
third gear disengaged
second gear engaged.

FIG. 6c shows the final phase of the gear change from the third to the second gear, with the coupling unit first being engaged, so that the input shafts 17, 18 are coupled. Thereafter, the friction clutch 14 is closed, so that additional torque can flow from the combustion engine 11 via the input shafts 17, 18 and the pair of gearwheels of the second gear to the output gearwheel 28. Thereafter, the electric machine 12 can be taken out of the torque flow by disengaging the second gear. Thickened lines symbolise the torque flow from the internal combustion engine 11 and from the electric machine 12 to the output gearwheel 28.

The switched conditions are as follows:
torque from the internal combustion engine CE
torque from the electric machine EM (optional)
friction clutch Cl closed
coupling unit CU closed
second gear engaged.

When the second gear is newly engaged or remains engaged, this represents the boost mode of the first gear. For each gear of the first partial drive 15 connected to the internal combustion engine 11 (first, third, fifth gear), there are four different stages of the boost mode which can be activated by engaging the second, forth or sixth gear of the second partial drive 16 or by engaging the coupling unit 29.

Figure 7A:
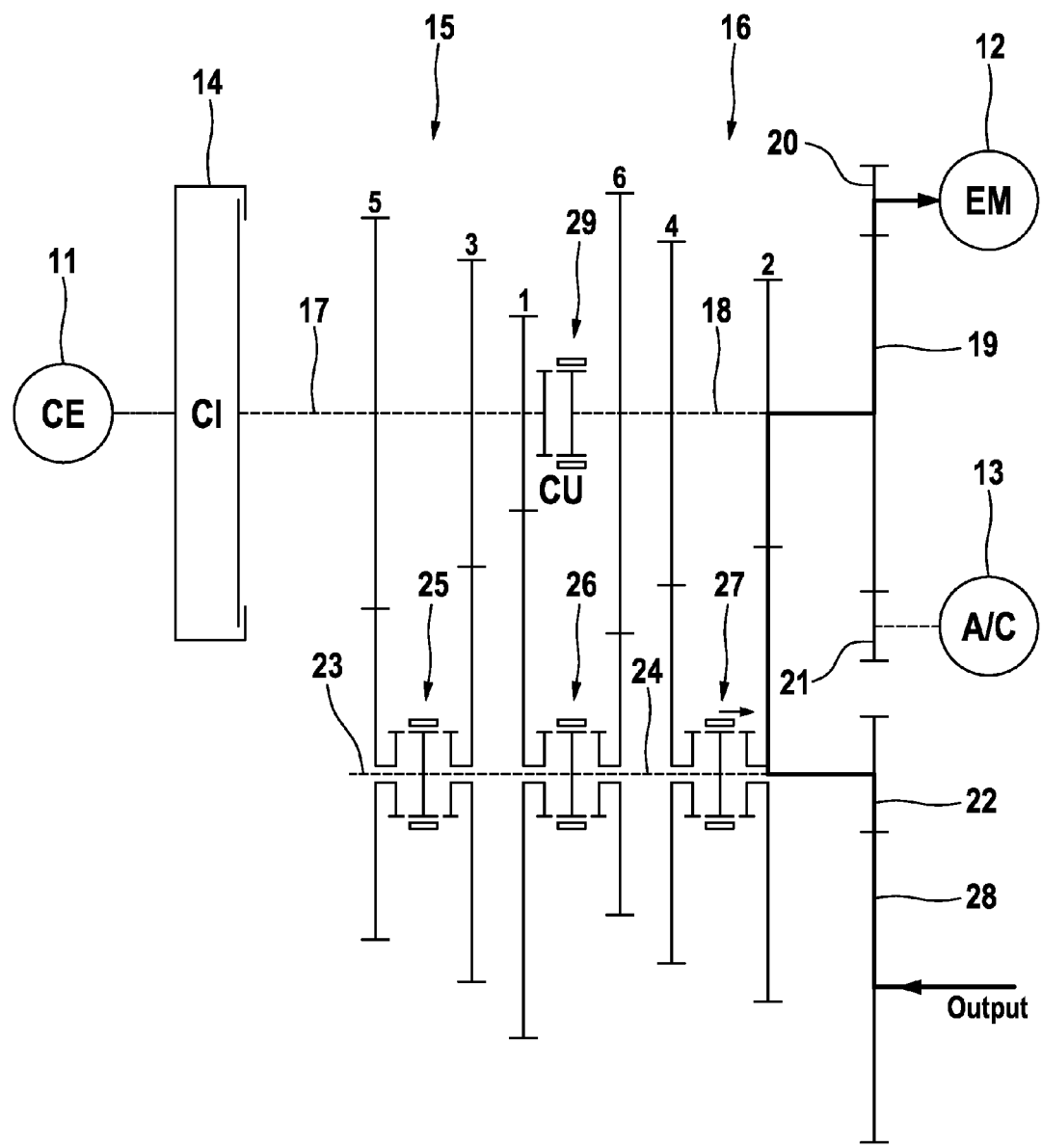
FIG. 7a shows the drive concept according to FIG. 1 in the recuperation mode (second, fourth or sixth gear).

FIG. 7a shows a switched condition for energy recuperation when the vehicle is being pushed. The friction clutch 14 is open and the coupling unit 29 is disengaged. Via the engaged second gear, torque flows from the output gearwheel 28 via the output shaft 24 to the input shaft 18, so that the electric machine 12 is generator-operated. A thickened line symbolises the torque flow from the output gearwheel 28 to the electric machine 12.

The switched conditions are as follows:
torque to the electric machine EM
friction clutch Cl open
coupling unit CU disengaged
second gear engaged.

When the coupling unit 29 is disengaged, the recuperation mode can alternatively being used in the second, forth, or sixth gear of the second partial drive 16.

Figure 7B:
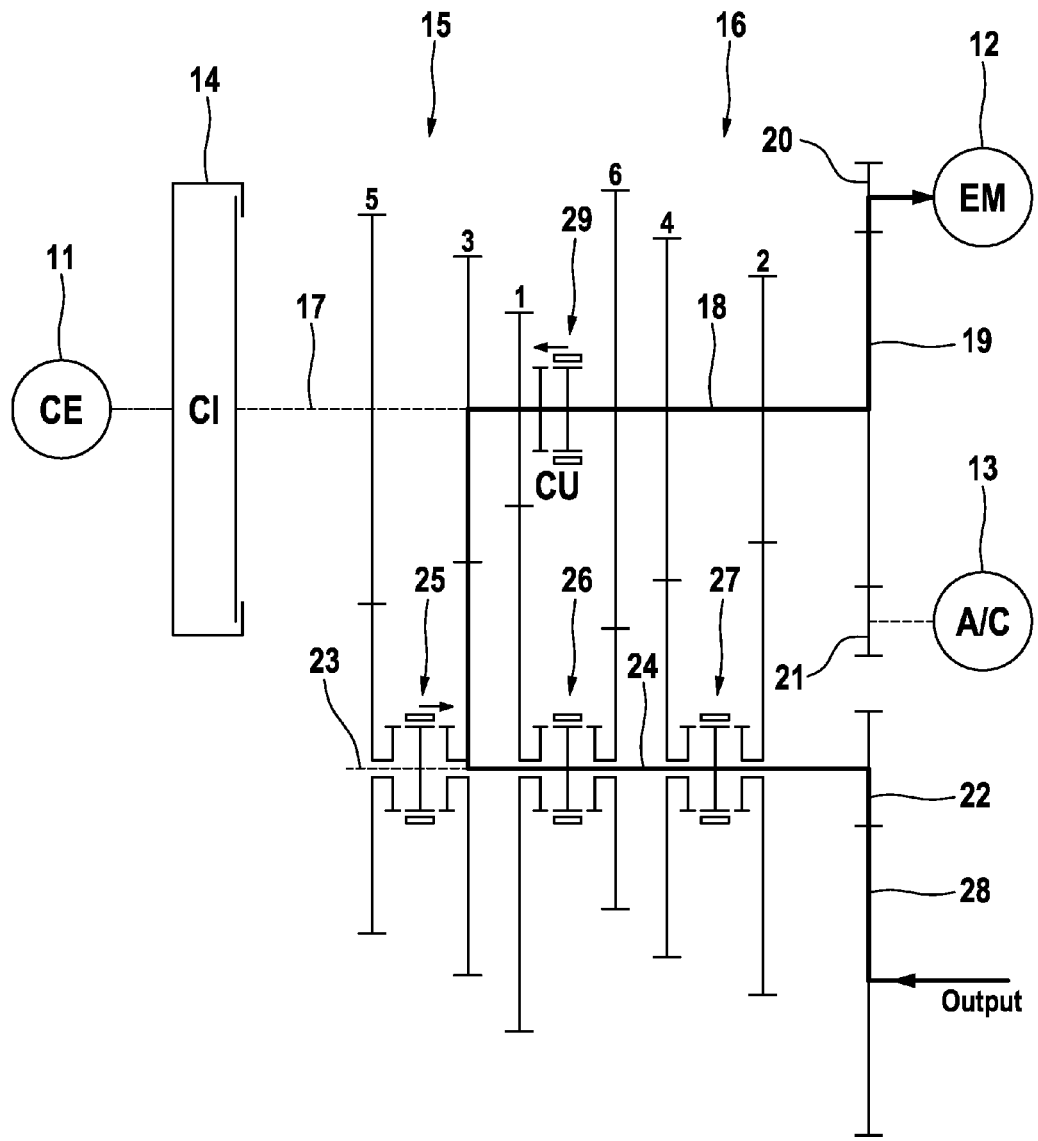
FIG. 7b shows the drive concept according to FIG. 1 in the recuperation mode (first, third or fifth gear).

FIG. 7b shows the switched condition in the recuperation mode, i.e. when the vehicle is being pushed, using the third gear. The switching gearwheel of the third gear is coupled by the switching unit 25 to the output shaft 23, so that torque flows from the output gearwheel 28 via the output shaft 24, 23. Just as in the case when the first and the fifth gear are used, the coupling unit 29 has to be engaged so that torque is transmitted from the input shaft 17 to the input shaft 18 and from there to the electric machine 12 which is generator-operated. A thickened line symbolised the torque flow from the output gearwheel 28 to the electric machine 12.

The switched conditions are as follows:
torque to the electric machine EM
friction clutch Cl open
coupling unit CU engaged
third gear engaged.

When the coupling unit 29 is engaged, the recuperation mode can be alternatively being used in the first, third or fifth gear of the first partial drive 15.

Figure 8:
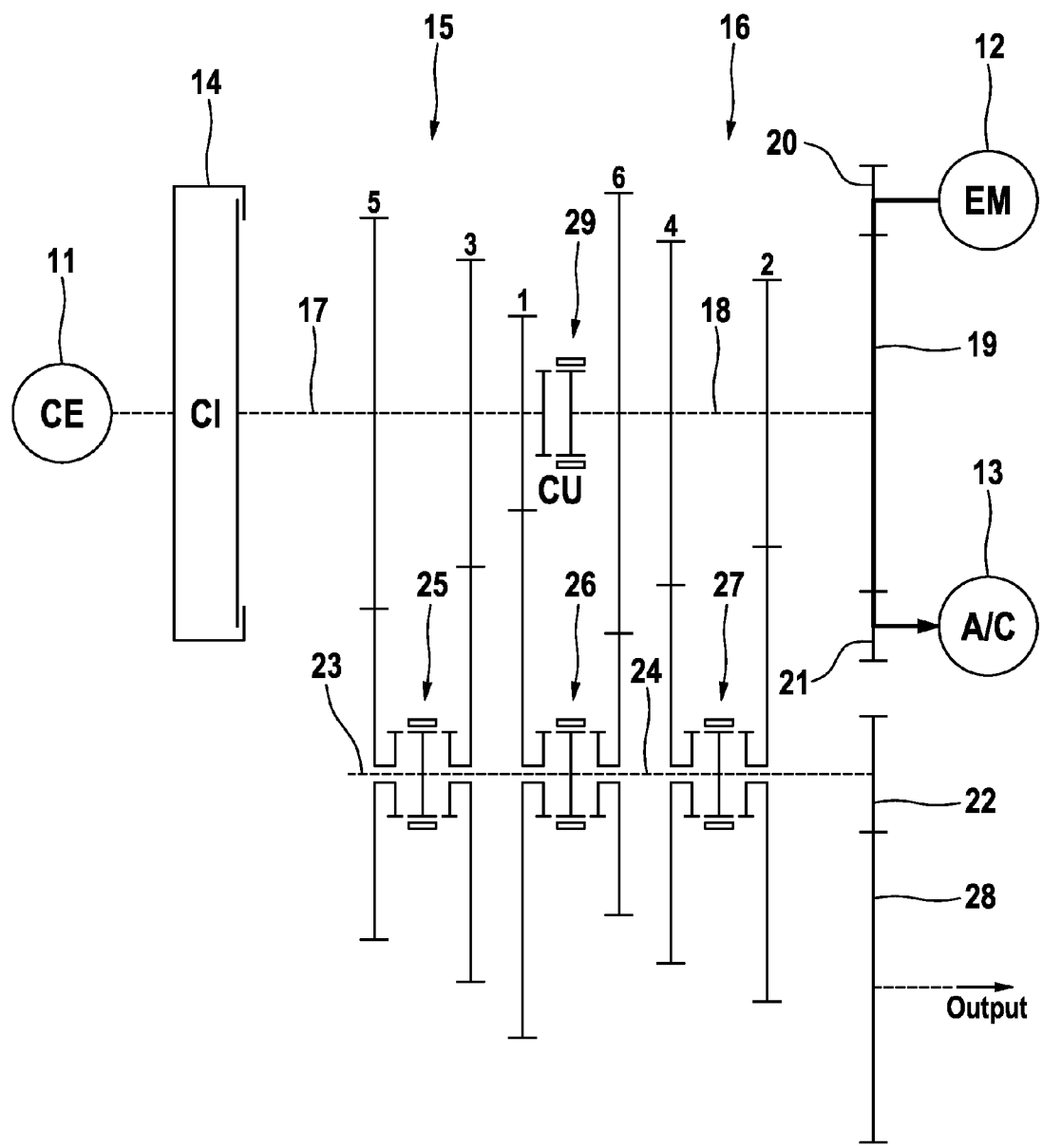
FIG. 8 shows the drive concept according to FIG. 1 when the vehicle is the stationary condition and driving a compressor.

FIG. 8 shows the auxiliary output machine, i.e. the air conditioner compressor 13, being operated by the electric machine 12 when the vehicle is stationary. The friction clutch 14 is open and the coupling unit 29 is also disengaged. All the switching units 25, 26, 27 are in the neutral position. The thickened line symbolises the torque flow from the electric machine 12 to the air conditioner compressor 13.

The switched conditions are as follows:
torque from the electric machine EM
friction clutch Cl open
coupling unit CU disengaged
all switching units in the neutral position.

Figure 9:
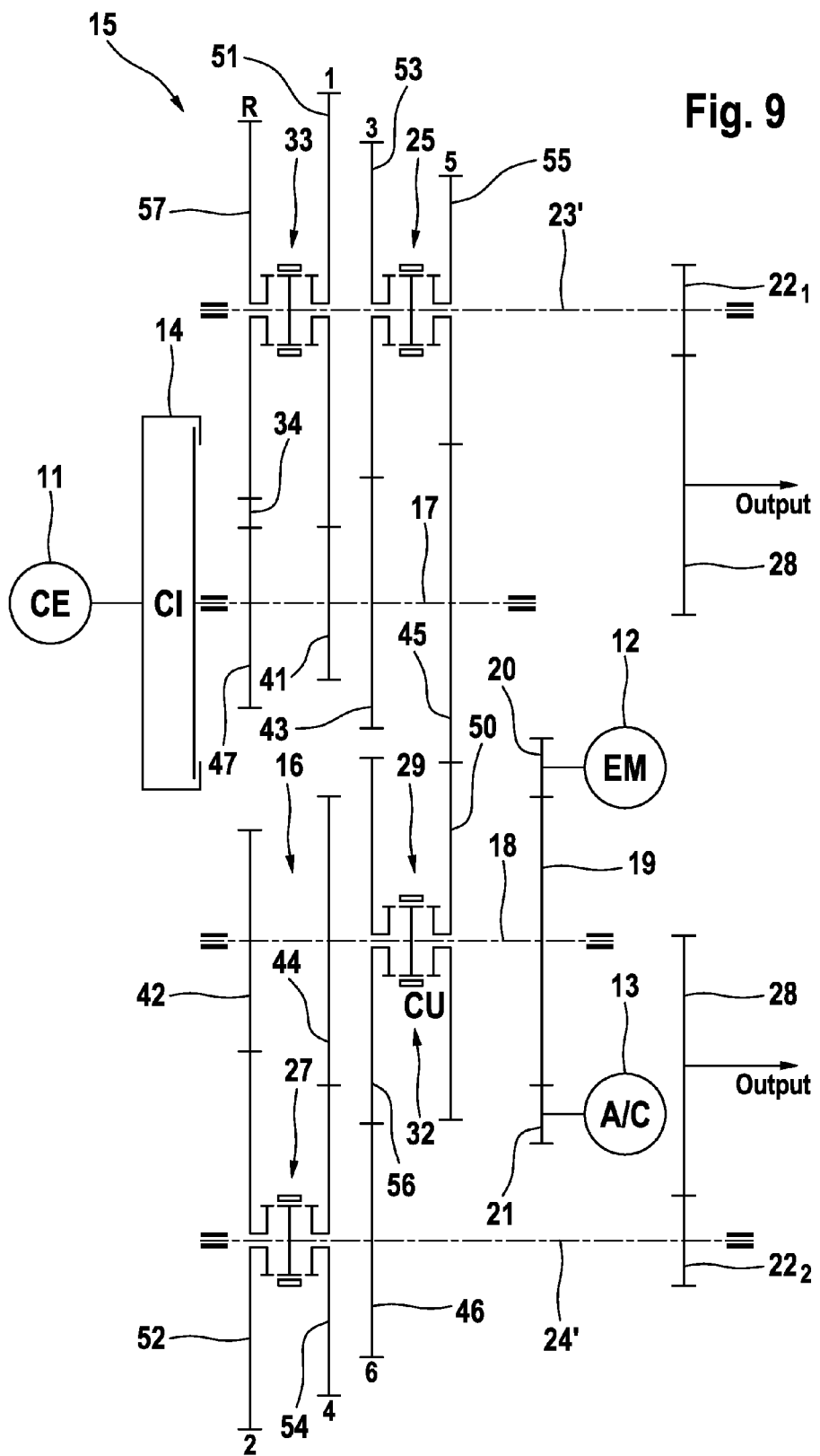
FIG. 9 shows the drive concept of an inventive hybrid drive system in a second embodiment in a four-shaft-design in a neutral position.

FIG. 9 shows an inventive hybrid drive system in a second embodiment. The description of FIG. 9, in principle, also applies to that of FIGS. 10 to 16 which show different switched conditions of the same drive concept which is shown in FIG. 9 in the neutral position. Identical components and assemblies have been given the same reference numbers as in FIGS. 1 to 8. In this case, too, there is shown a hybrid drive system with a main driving machine 11 in the form of an internal combustion engine CE with a supplementary driving machine 12 in the form of an electric machine EM and an auxiliary output machine 13 in the form of an air conditioner compressor A/C, which comprise two gear changing partial drives 15, 16. The input shaft 17 of the first partial drive 15 is connectable by a friction clutch 14 to the internal combustion engine 11. Furthermore, the partial drive 15 comprises an output shaft 23' which carries the switching gearwheels of gears 1, 3 and 5 as well as of the reverse gear R. The associated output shaft 23' drives an output gearwheel 28 via a gearwheel $22_1$. The second partial drive 16 comprises an input shaft 18 which, via an input gearwheel 19 and a gearwheel 20, is in a driving connection with the electric machine 12. Via a farther gearwheel 21, the input shaft 18 is also in a driving connection with the air conditioner compressor 13. The input shaft 18 is connectable to the input shaft 17 by a coupling unit 29 via a pair of gearwheels 45, 50, with the gearwheel 45 being firmly positioned on the input shaft 17, whereas the gearwheel 50 arranged on the input shaft 18 is a switching gearwheel which is switched by the coupling unit 29. The coupling unit is part of the switching unit 32 which, at the same time, switches the sixth gear. A further switching unit 27 for the second and the fourth gear is positioned on the associated output shaft 24' of the partial drive 16. The output shaft 24' acts via a gearwheel $22_2$ also on the output gearwheel 28 which, for drawing reasons, is shown twice in this figure because, in actual fact, the shafts 17, 18, 23', 24' are not positioned in one plane. In this embodiment, the partial drive 15 also comprises a reverse gear which, via a switching unit 33, is switched jointly with the first gear. The set of gearwheels of the reverse gear R comprises a reversing gearwheel 34.

The fixed gearwheels of gears 1 to 5 and of the reverse gear R which are arranged in a rotationally fast way on the input shafts 17, 18 are designated in said gear sequence with the reference numbers 41, 42, 43, 44, 45, 47 and the corresponding switching gearwheels of the gears, which switching gearwheels are loose gearwheels connectable to the output shafts 23', 24' are designated in said gear sequence with reference numbers 51, 52, 53, 54, 55, 57 each in FIG. 9 only. In contrast hereto, the fixed gearwheel 46 of the sixth gear is arranged on the output shaft 24' in a rotationally fast way, whereas the respective switching gearwheel 56 is arranged on the second input shaft 18 in the form of a connectable loose gearwheel.

Figure 10:
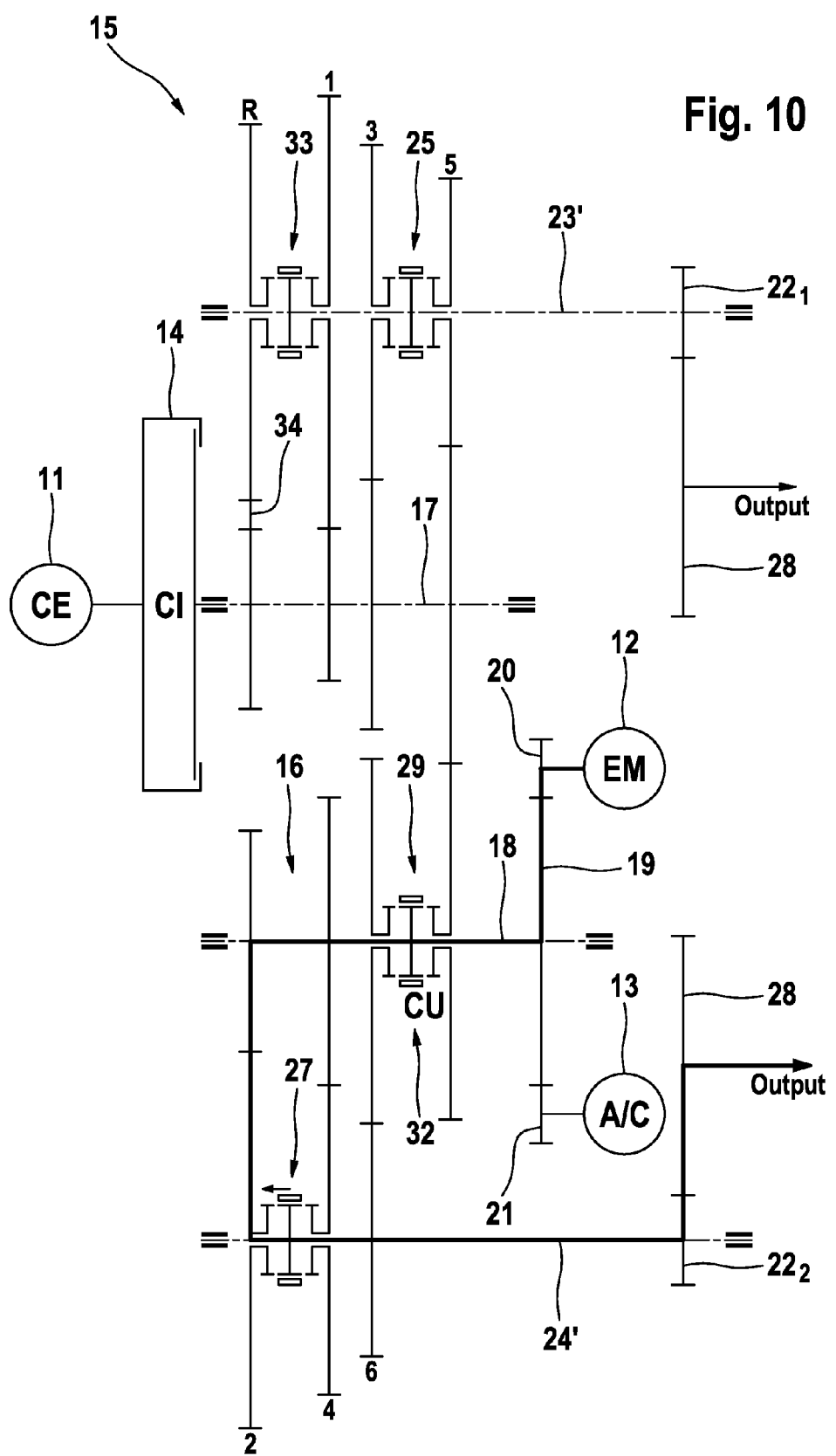
FIG. 10 shows the drive concept according to FIG. 9 when starting and driving with the electric machine EM.

FIG. 10 shows the driving condition of the vehicle being effected electrically. The friction clutch 14 of the internal combustion engine 11 is open and the coupling unit 29 is also disengaged, whereas the second gear is engaged by the switching unit 27. There occurs the torque flow, shown by thickened lines, from the electric machine 12 via the input shaft 18 to the output shaft 24' and from there to the output gear 28.

The switched conditions are as follows:
torque from the electric machine EM
friction clutch Cl open
coupling unit CU disengaged
second gear engaged.

Figure 11:
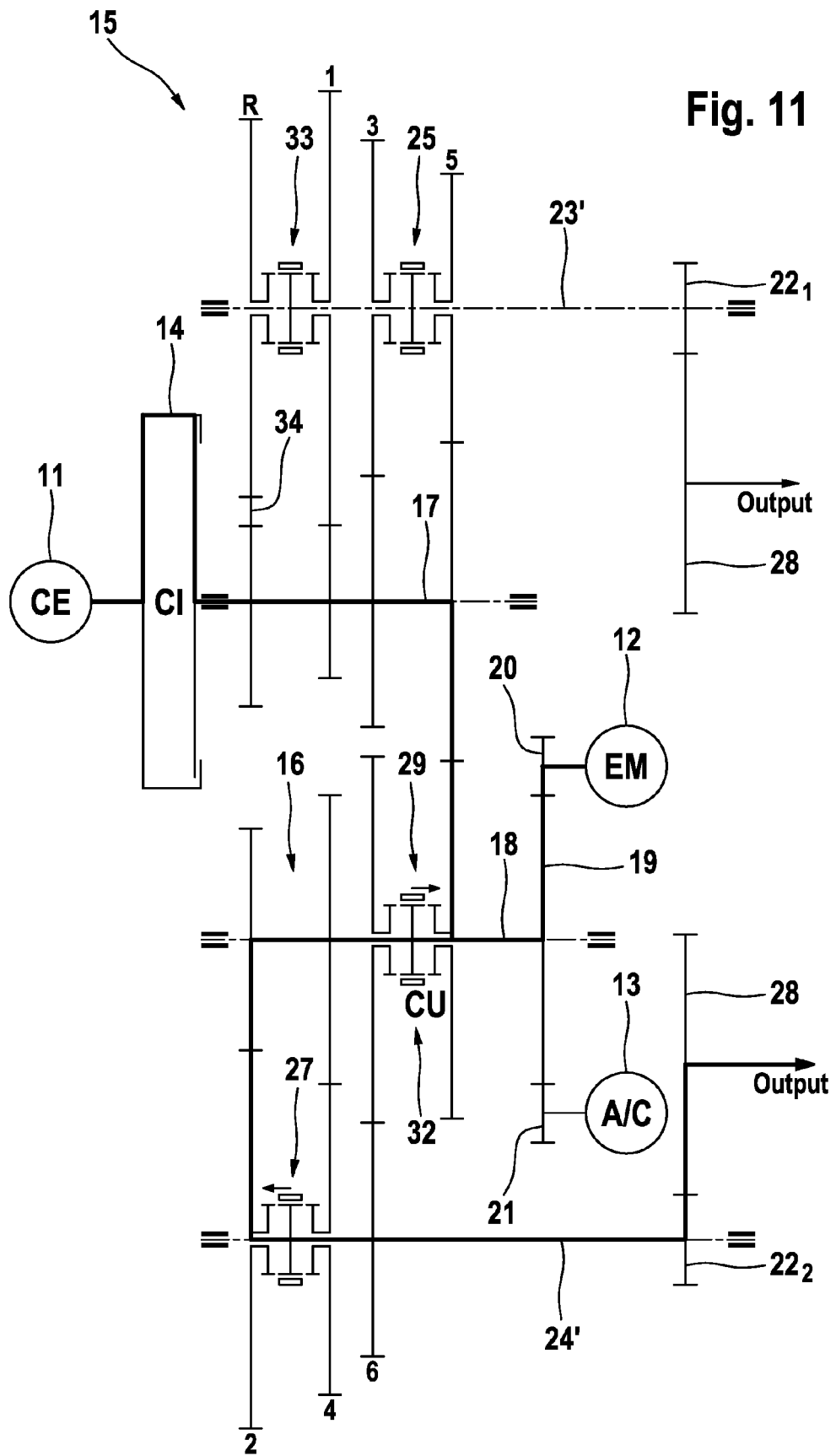
FIG. 11 shows the drive concept according to FIG. 9 when starting the internal combustion engine CE by the electric machine EM with the vehicle driving.

FIG. 11 shows the starting process of the internal combustion engine 11 when the vehicle is driven by the electric machine 12. The second gear is engaged by the switching unit 27. In addition, the coupling unit 29 is engaged and for starting the friction clutch 14 is closed. The torque flow symbolised by thickened lines takes place from the electric machine 12 to the internal combustion engine and to the output gearwheel 28.

The switched conditions are as follows:
torque from the electric machine EM
coupling unit CU engaged
friction clutch Cl closed
second gear engaged.

Figure 12:
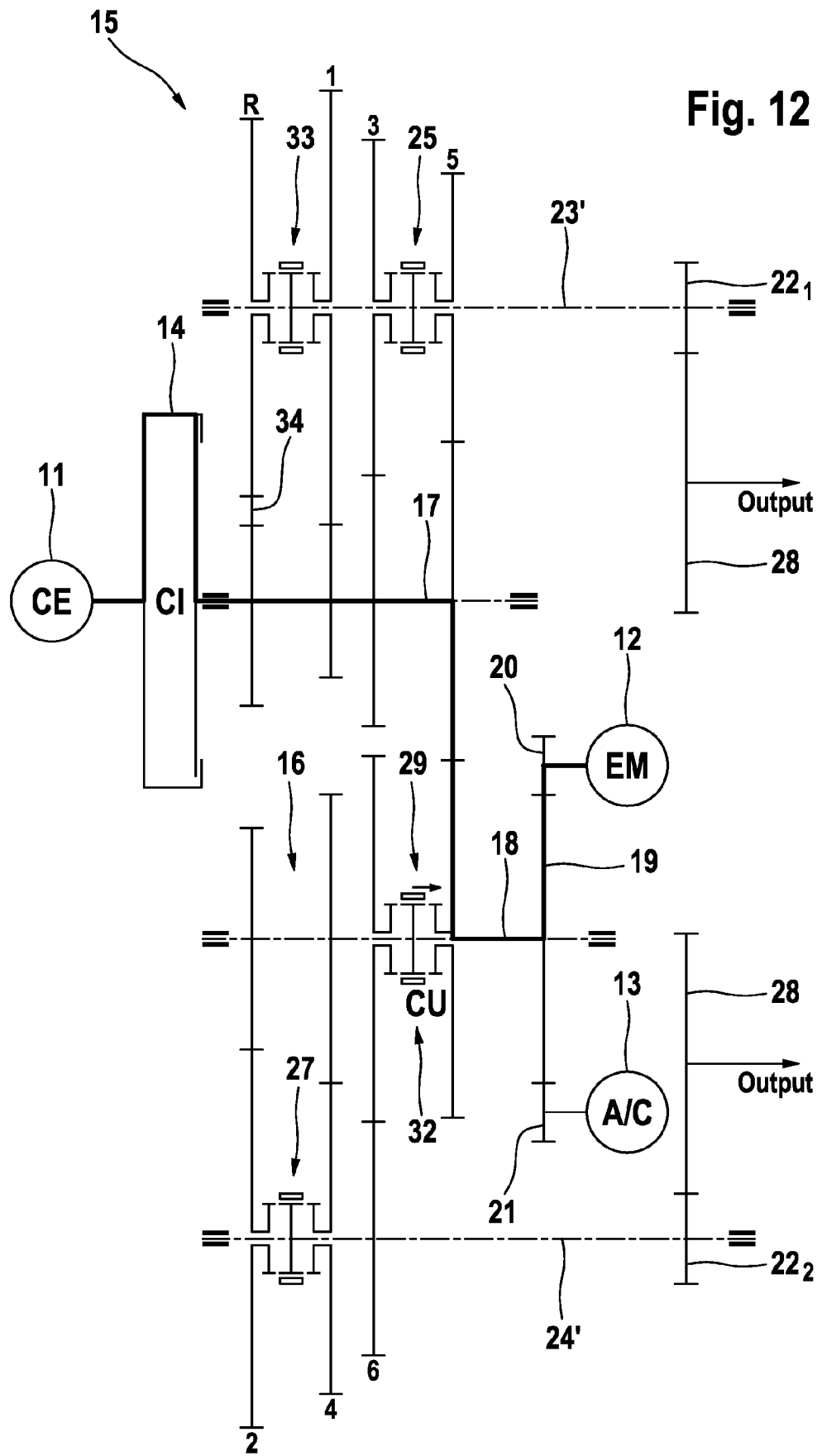
FIG. 12 shows the drive concept according to FIG. 9 when starting the internal combustion engine CE by the electric machine EM in the stationary condition of the vehicle.

FIG. 12 shows the starting process of the internal combustion engine 11 by means of the electric machine 12 when the vehicle is stationary. The coupling unit 29 is engaged for coupling the input shafts 18 and 17. The friction clutch 14 is closed. All gears are disengaged. The torque flow symbolised by thickened lines takes place from the electric machine 12 via the input shaft shafts 18, 17 to the internal combustion engine 11.

The switched conditions are as follows:
torque from the electric machine EM
coupling unit CU engaged
friction clutch CU closed.

The illustrations of FIG. 13 show different phases of the switching process from the fourth to the fifth gear.

Figure 13A:
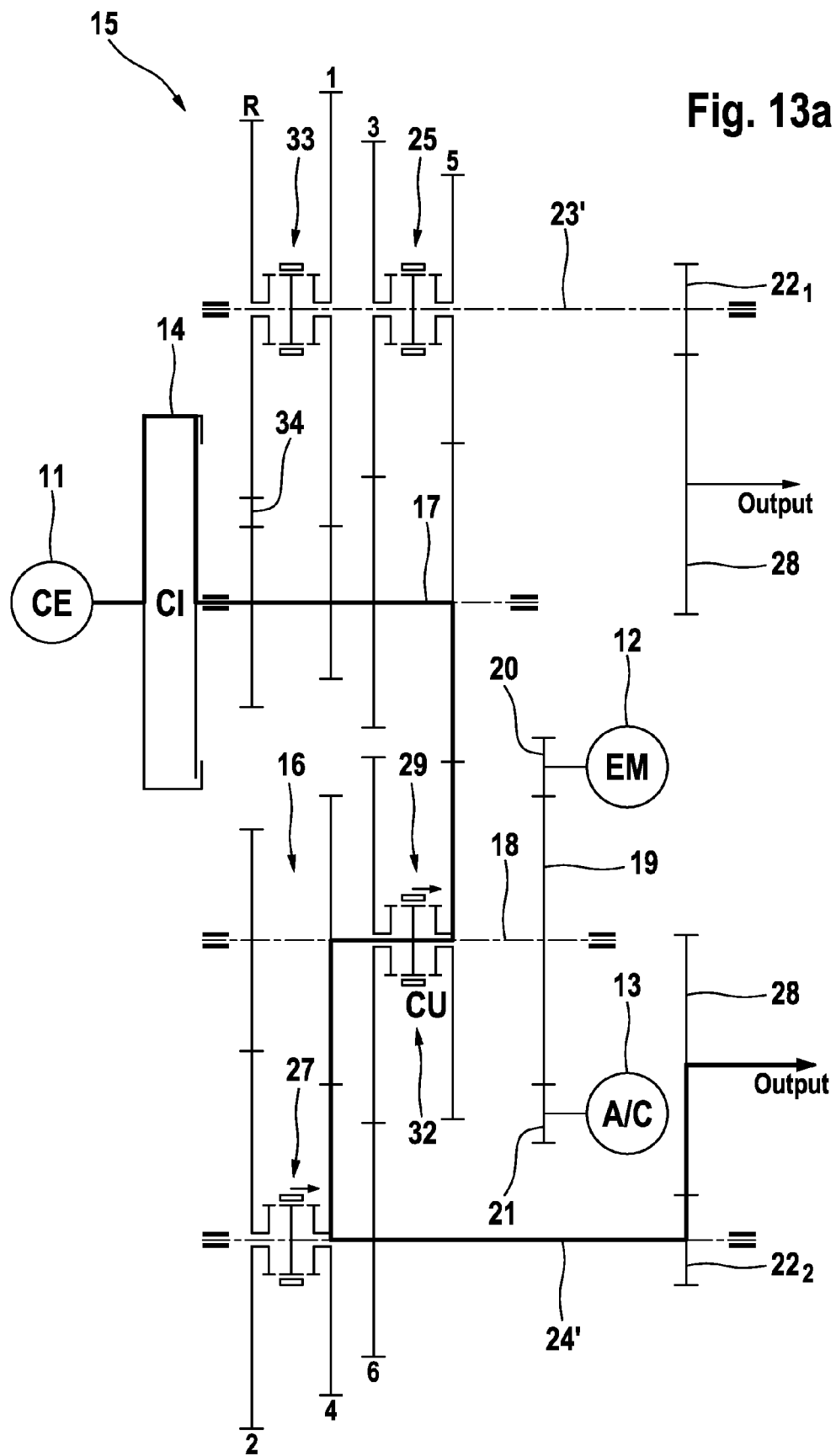
FIG. 13a shows the drive concept according to FIG. 9a when changing up from the fourth gear to the fifth gear during a first phase.

In FIG. 13a, the friction clutch 14 is closed and the coupling unit 29 is engaged. Torque flows from the input shaft 17 to the output shaft 18; the switching units 33, 25 on the output shaft 23' are in a neutral position, whereas the fourth gear is engaged by the switching unit 27. Torque flows from the internal combustion engine 11 via the input shaft 24' to the output gear 28, as indicated by thickened lines.

The switched conditions are as follows:
torque from the internal combustion engine CE
friction clutch Cl closed
coupling unit CU engaged
fourth gear engaged.

Figure 13B:
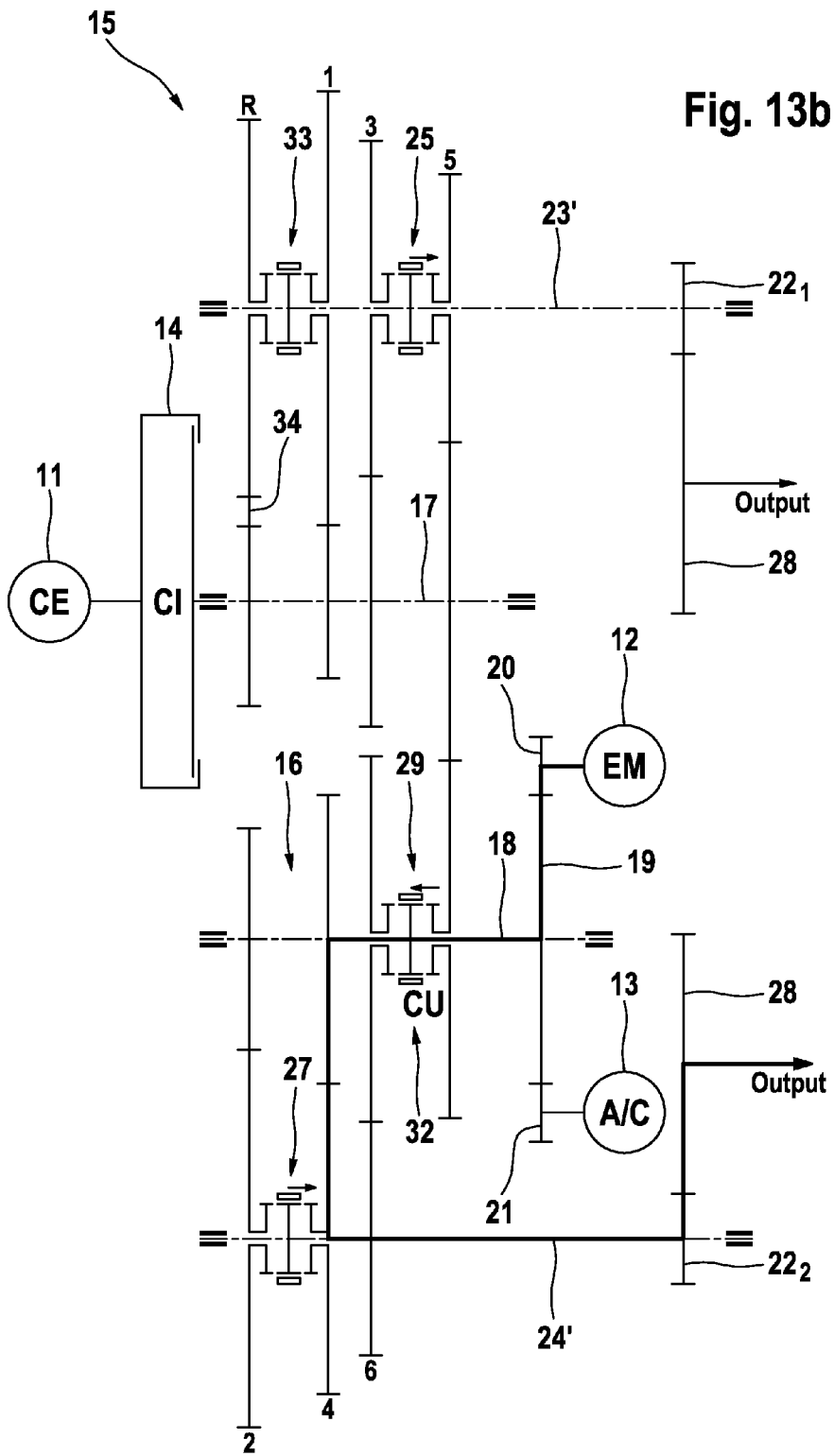
FIG. 13b shows the drive concept according to FIG. 9 when changing up from the fourth gear to the fifth gear during a second phase.

FIG. 13b shows that by disengaging the coupling unit 29, the input shaft 17 is disconnected from the input shaft 18. At the same time, the electric machine 12 takes over the task of transmitting torque via the gearwheels of the fourth gear to the output shaft 24'. The internal combustion engine 11 is also uncoupled from the input shaft 17 by opening the friction clutch 14. The fifth gear is engaged by the switching unit 25. As indicated by thickened lines, the torque flow takes place from the electric machine 12 via the shafts 18, 24' to the output gearwheel 28.

The switched conditions are as follows:
torque from the electric machine EM
coupling unit CU disengaged
friction clutch Cl open
fourth gear engaged.

Figure 13C:
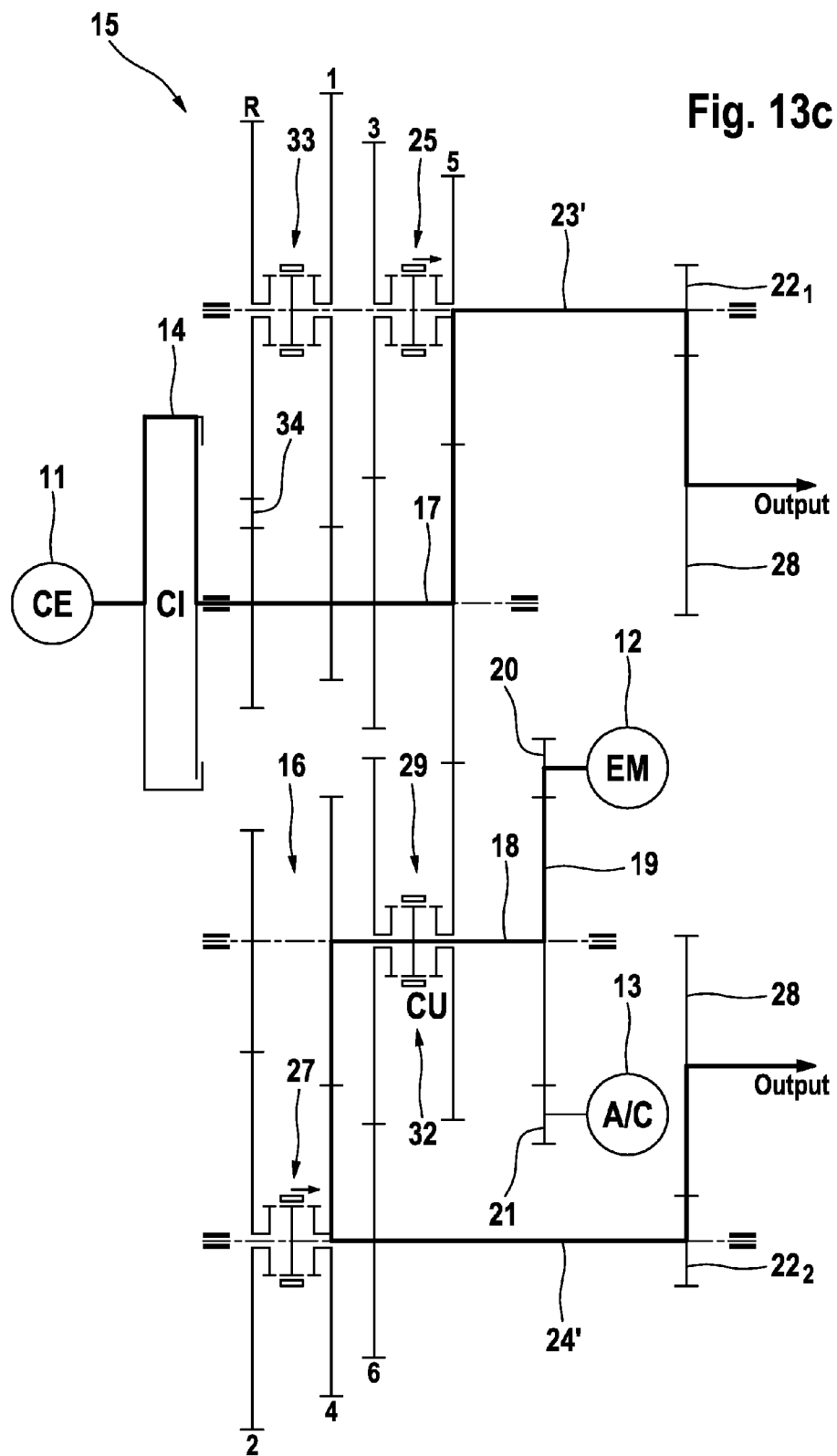
FIG. 13c shows the drive concept according to FIG. 9 when changing up from the fourth gear to the fifth gear in a third phase.

In FIG. 13c, the friction clutch 14 is closed again, so that the internal combustion engine 11 transmits torque to the output gearwheel 28 via the input shaft 17 of the first partial drive 15, the gearwheels of the fifth gear and the output shaft 23'. This corresponds to the so-called boost mode. However, the provision of power by the electric machine 12 can also be cancelled. The torque flow takes place from the combustion engine 11 via the shafts 17, 23' to the output gearwheel 28 and from the electric machine 12 via the shafts 18, 24' to the output gearwheel 28, as shown by thickened lines.

The switched conditions are as follow;
torque from the internal combustion engine CE
friction clutch Cl closed
torque from the electric machine EM (optional)
coupling unit CU disengaged
fifth gear engaged
fourth gear engaged.

The illustrations of FIG. 14 show the vehicle driving in the boost mode, i.e. both driving machines 11, 12 provide torque.

Figure 14A:
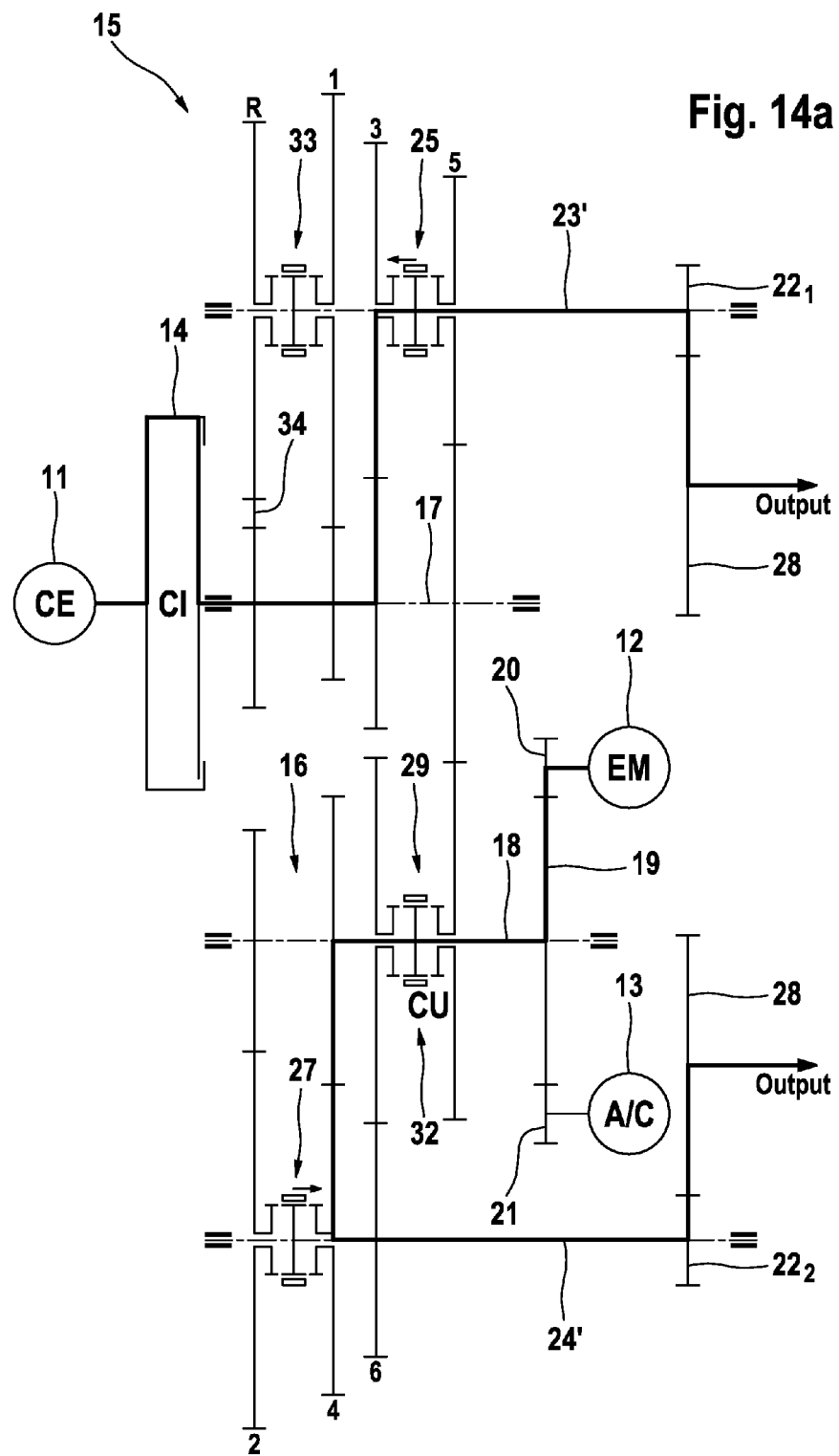
FIG. 14a shows the drive concept according to FIG. 9 in the boost mode (internal combustion engine CE in the first, the third or the fifth gear).

In FIG. 14a, the combustion engine 11, with the clutch 14 being in the closed condition, is coupled to the output gearwheel 28 by means of the gearwheels of the third gear which is engaged by the switching unit 25. At the same time, the electric machine 12 is coupled to the output gear 28, with the fourth gear being engaged by the switching unit 27. The coupling unit 29 necessarily has to be disengaged. The boost mode shown here can be set in the same way for gears 1 and 5 of the first partial drive 15. The torque flow takes place from the internal combustion engine 11 via the shafts 17, 23' to the output gearwheel 28 and from the electric machine 12 via the shafts 18, 24' to the output gearwheel 28.

The switched conditions are as follows:
torque from the internal combustion engine CE
friction clutch Cl closed
torque from the electric machine EM
coupling unit CU disengaged
third gear engaged
fourth gear engaged.

With the coupling unit 29 being disengaged, the recuperation mode can be alternatively being used in the second, forth or sixth gear of the second partial drive.

Figure 14B:
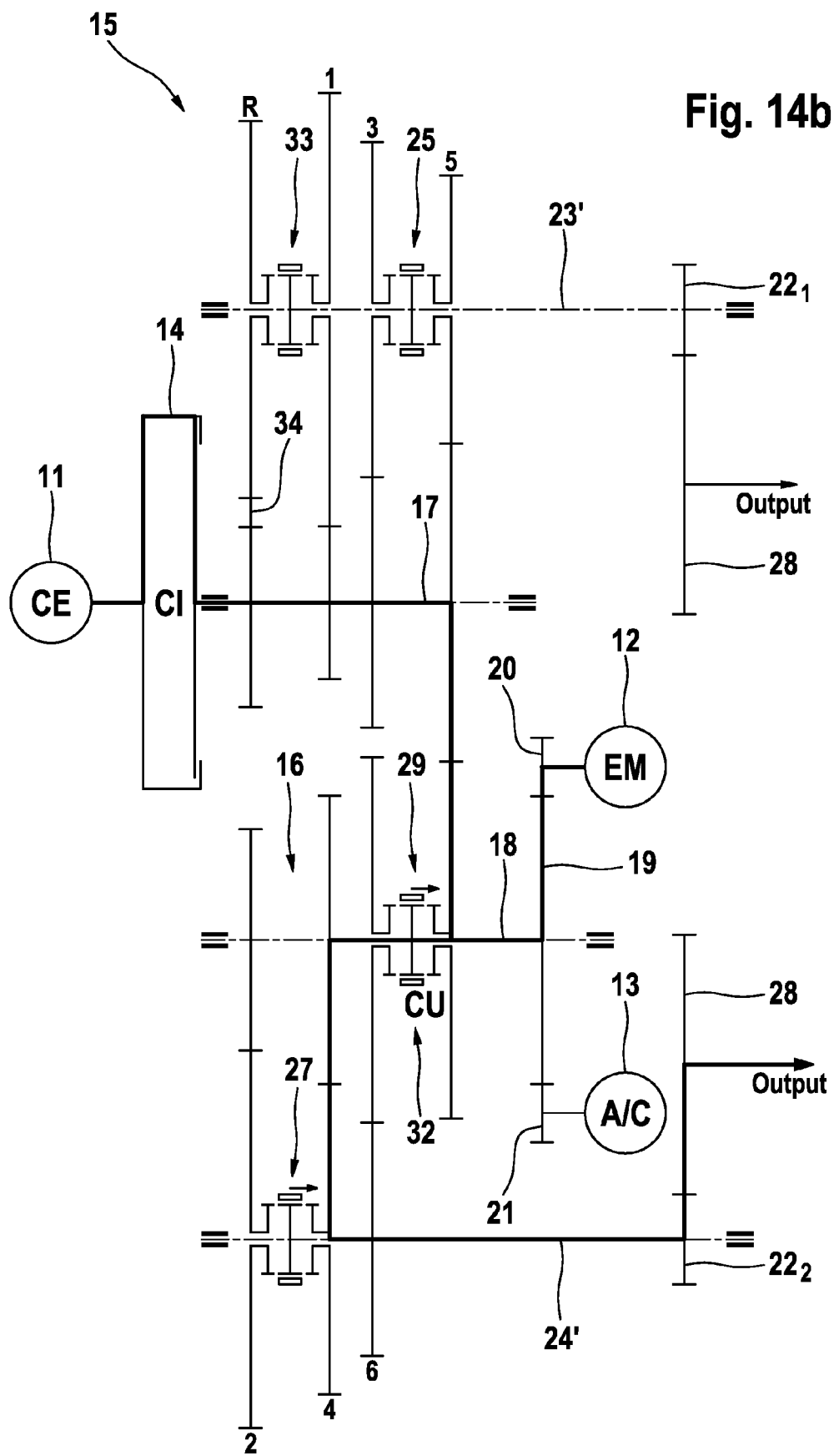
FIG. 14b shows the drive concept according to FIG. 9 in the boost mode (internal combustion engine CE in the second, the fourth or the sixth gear).

FIG. 14b shows the friction clutch 14 of the internal combustion engine 11 in a closed condition, but the switching units 33, 25 of the first partial drive 15 are in the neutral position. However, the coupling unit 29 is engaged and the fourth gear is engaged by means of the switching unit 27, so that torque is introduced into the input shaft 18 both by the electric machine 12 and by the internal combustion engine 11 and transmitted to the output shaft 24'. The switched condition shown here can also be used for gears 2 and 6 of the second partial drive 16 for the boost mode. The torque flow takes place from the internal combustion engine 11 via the shafts 17, 18, 24' to the output gearwheel 28.

The switched conditions are as follows:
torque from the internal combustion engine CE
friction clutch Cl closed
torque from the electric machine EM
coupling unit CU engaged
fourth gear engaged.

Figure 15:
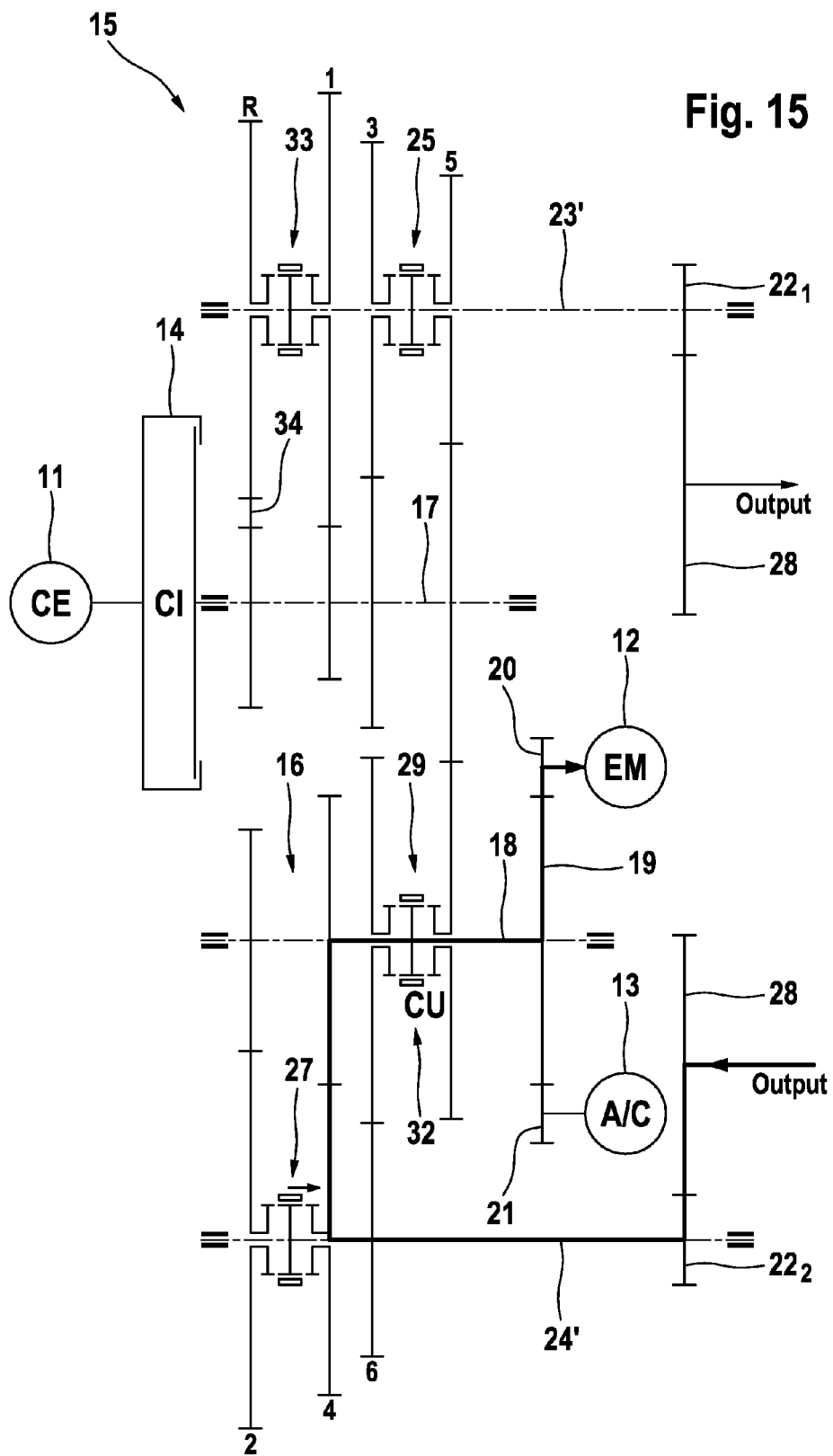
FIG. 15 shows the drive concept according to FIG. 9 in the recuperation mode.

FIG. 15 shows the recuperation mode, i.e. the recovery of energy when the vehicle is being pushed. The friction clutch 14 of the internal combustion engine 11 is open or closed; in each case, however, the switching units 33, 25 of the first partial drive are in the neutral position and the coupling unit 29 is disengaged. In the second partial drive, the fourth gear is engaged by the switching unit 27. Torque flows from the output gearwheel 28 via the output shaft 24' and the pair of gearwheels of the fourth gear to the input shaft 18 and thus to the electric machine which is generator-operated. The second and the sixth gear of the second partial drive 16 can be used in the same way for the recuperation mode.

The switched conditions are as follows:
friction clutch Cl open
coupling unit CU disengaged
fourth gear engaged.

Figure 16:
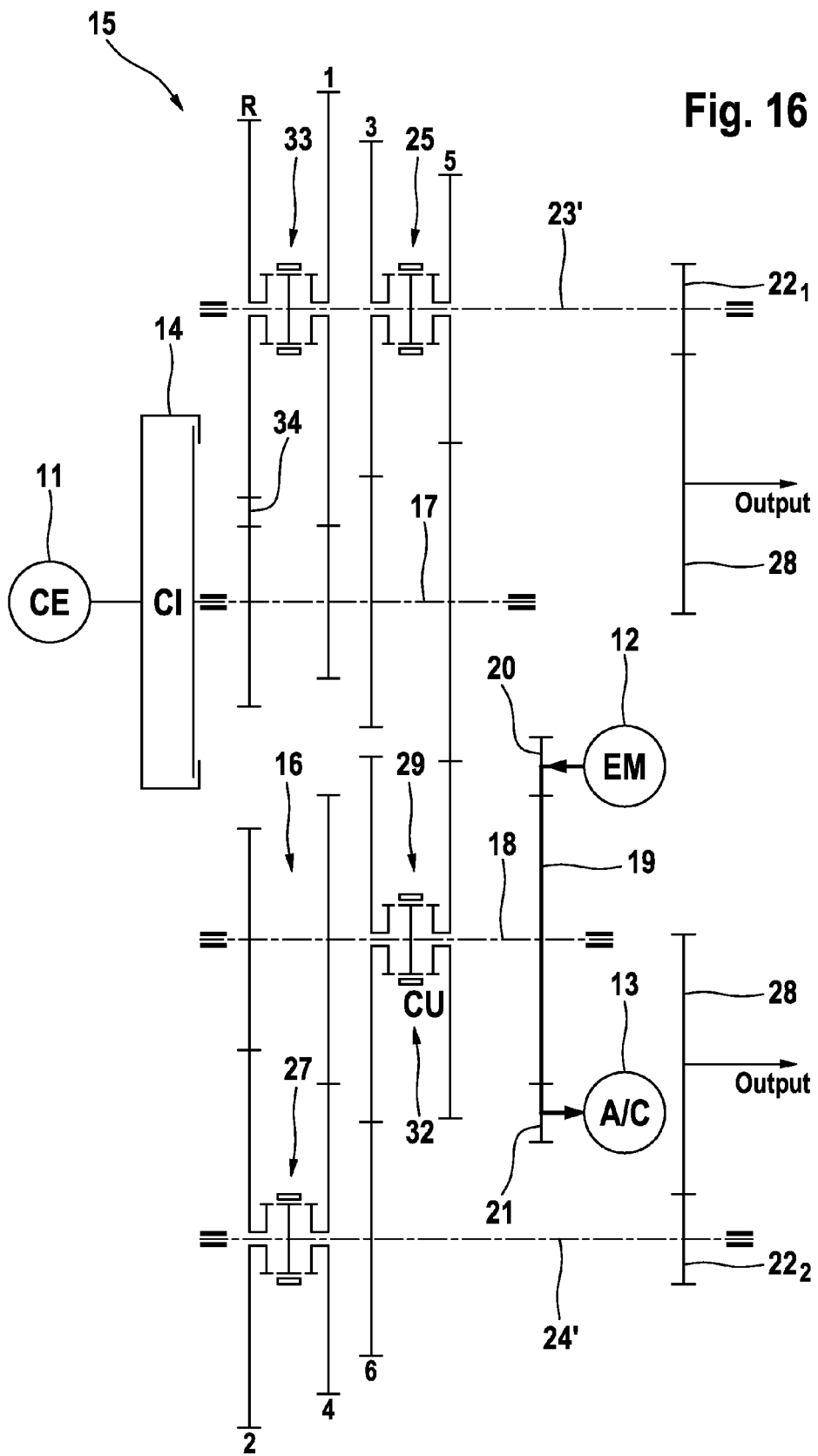
FIG. 16 shows the drive concept according to FIG. 9 in the stationary condition of the vehicle when driving a compressor.

FIG. 16 shows the air conditioner compressor 13 being driven by the electric machine 12 with the vehicle being in the stationary condition. All the switching units and the coupling unit 29 are in the neutral position. The friction clutch 14 can be open or closed. Torque flows from the electric machine 12 to the air conditioner compressor 13, as indicated by a thickened line.

The switched conditions are as follows:
friction clutch Cl open
coupling unit CU disengaged
all switching units in the neutral position.

Figure 17:
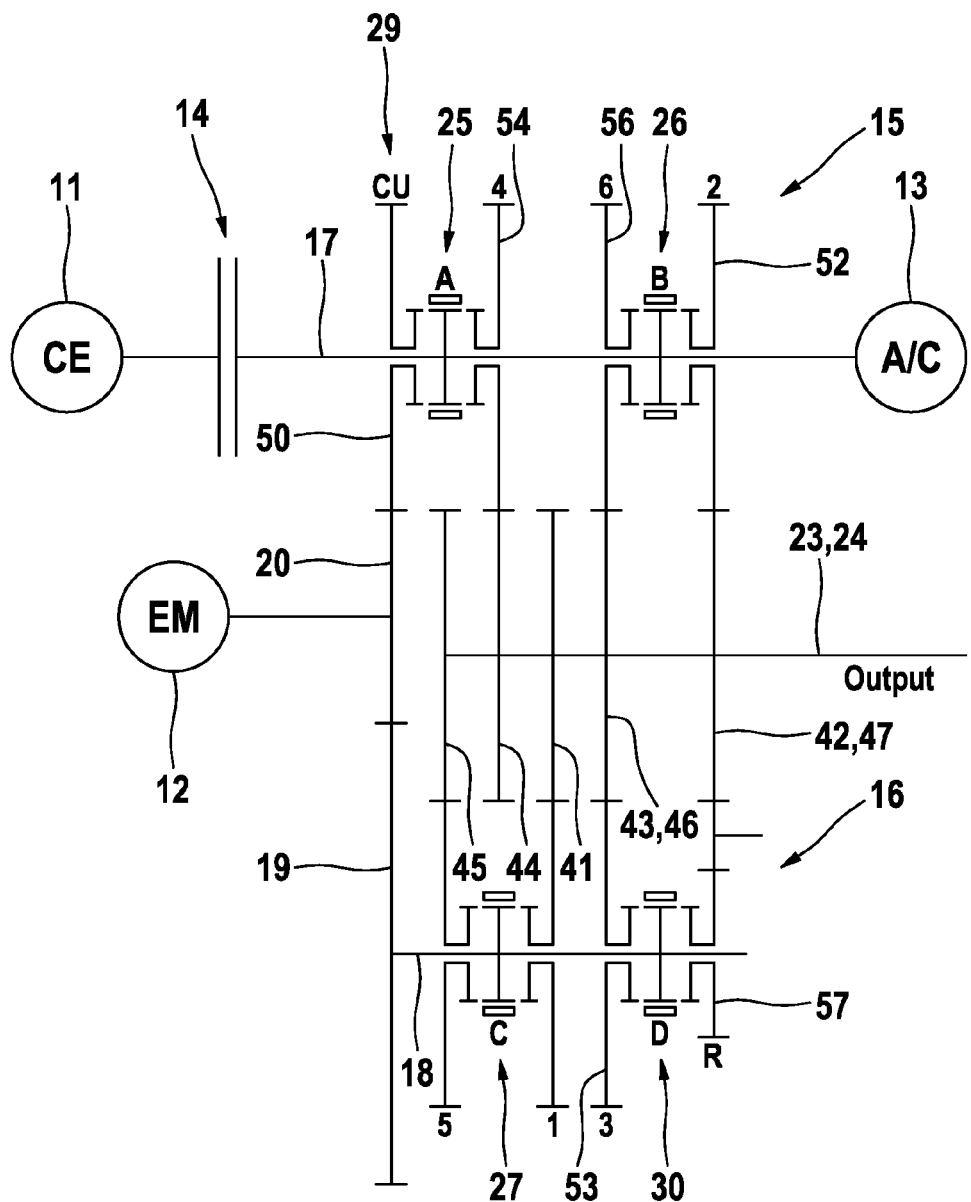
FIG. 17 shows the drive concept of an inventive hybrid drive system in a third embodiment in a three-shaft-design in a neutral position.

FIG. 17 shows an inventive hybrid drive system in a third embodiment. The subsequent description of FIG. 17, in principle, also applies to FIGS. 18 to 24 which merely show different switching conditions of the drive concept.

There is shown a hybrid drive system which comprises a main driving machine 11, here in the form of an internal combustion engine CE, a supplementary driving machine 12, here in the form of an electric machine EM, and an auxiliary driven machine 13, here in the form of a compressor for an air conditioning system A/C. The internal combustion engine 11 is connectable by a friction clutch 14 (Cl) which can be provided in the form of a wet or dry clutch. The drive comprises two gear changing partial drives 15, 16 (stepped gear changing boxes) which are characterised in that they each comprise their own input shafts 17 and 18. The input shaft 17 of the first partial drive carries the gearwheels of gears 4, 6 and 2 and is connectable by the friction clutch 14 to the internal combustion engine 11. The input shaft 17 is in direct driving connection with the air conditioning compressor 13. The input shaft 18 of the second partial drive 16 carries the gearwheels of gears 5, 1 and 3 as well as of the reverse gear R and an input gearwheel 19 which, by means of a gearwheel 20, is in a stepped down driving connection with the electric machine 12 and, by means of a gearwheel 21. In this embodiment, the output shafts 23, 24 of the two partial drives 15, 16 are integral with one another; more particularly, they are provided in the form of a one-piece shaft. The switching gearwheels of the individual gears are positioned on the input shaft 17, 18, and there is provided a switching unit 25 for gear 4 and a common switching unit 26 for gears 6 and 2, as well as a switching unit 27 for gears 5 and 1 and another common switching unit 30 for gear 3 and the reverse gear R. The switching gear of the reverse gear acts via a reversing gearwheel on an intermediate shaft upon a fixed gearwheel on the output shaft 23, 24. Between the input shafts 17, 18, in accordance with the invention, there is a coupling unit 29 (CU) effective which, more particularly if the speeds of the two input shafts are synchronised, can be switched so as to be suitable for various operating conditions which will be described below with reference to further figures. The coupling unit 29 comprises a loose gearwheel 50 on the input shaft 17 which is switchable by the switching unit 25, which gearwheel 50 is engaged with a drive gearwheel of the electric machine 12.

The fixed gearwheels of gears 1 to 6 and R which are arranged in a rotationally fast way on the output shaft 23, 24 have been given in the gear sequence the reference numbers 41, 42, 43, 44, 45, 46 and 47 and the respective switching gearwheels which are loose gearwheels suitable for being coupled to the input shafts 17, 18, have been given in the gear sequence the reference numbers 51, 52, 53, 54, 55, 56 and 57 each in FIG. 1 only. The fixed gearwheels and the loose gearwheels could also be interchanged between the input and output shafts.

Figure 18:
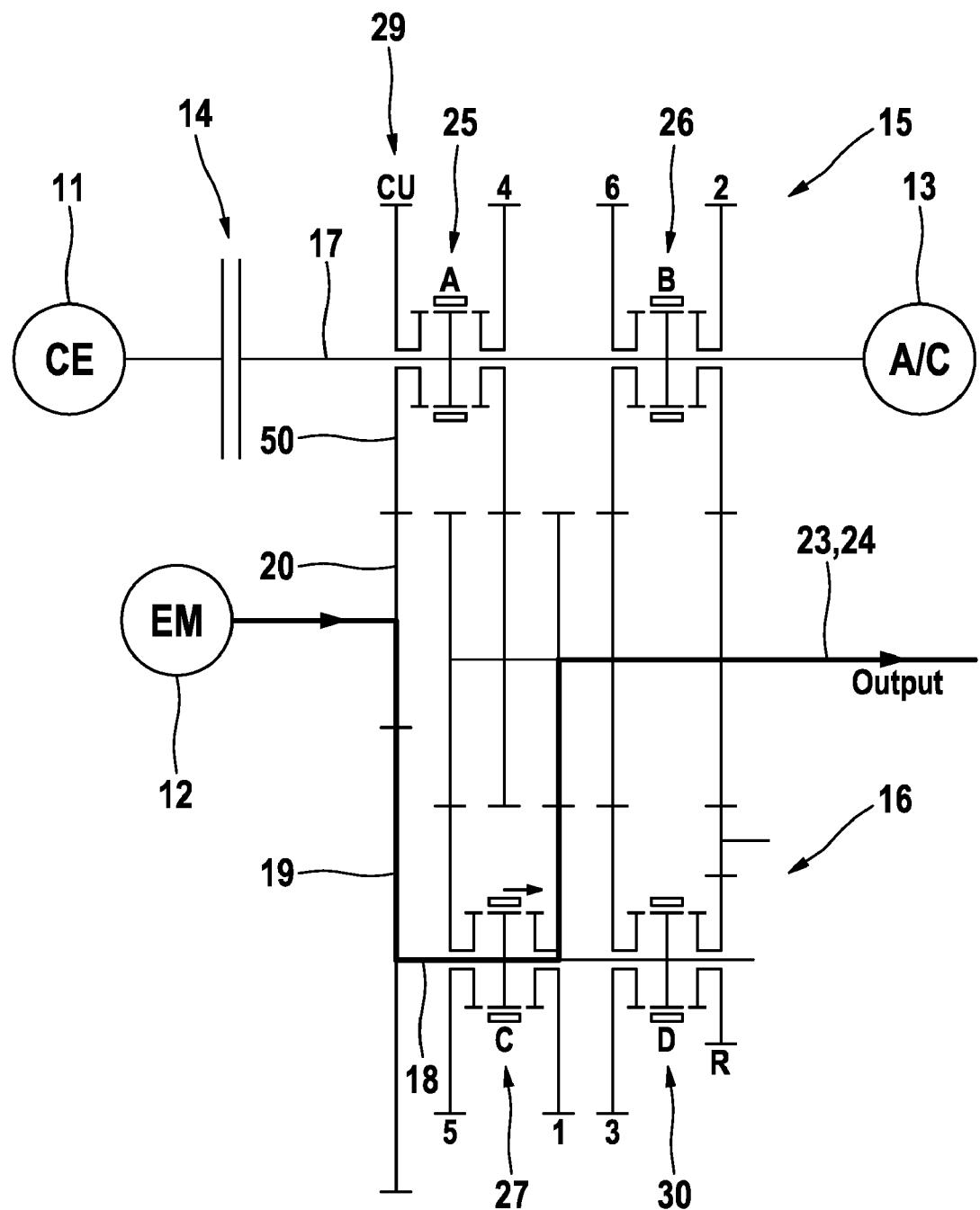
FIG. 18 shows the drive concept according to FIG. 17 when starting and driving the motor vehicle, using the electric machine EM.

In FIG. 18, the coupling unit 29 is disengaged, so that the input shafts 17, 18 are separated from one another. Of the drive gears, only the first gear is engaged by the switching unit 27. In this switched condition, electric starting the vehicle—depending on the direction of rotation for forward driving or reversing—can be effected by the electric machine, with driving the vehicle also being possible with the electric machine. It is conceivable to change up into the third or fifth gear, in which case the traction force would be interrupted. A darker line indicates the torque flow from the electric machine 12 to the output shaft 23, 24.

The following switched conditions apply:
torque from EM
clutch Cl open
coupling CU disengaged
first gear engaged.

Figure 19:
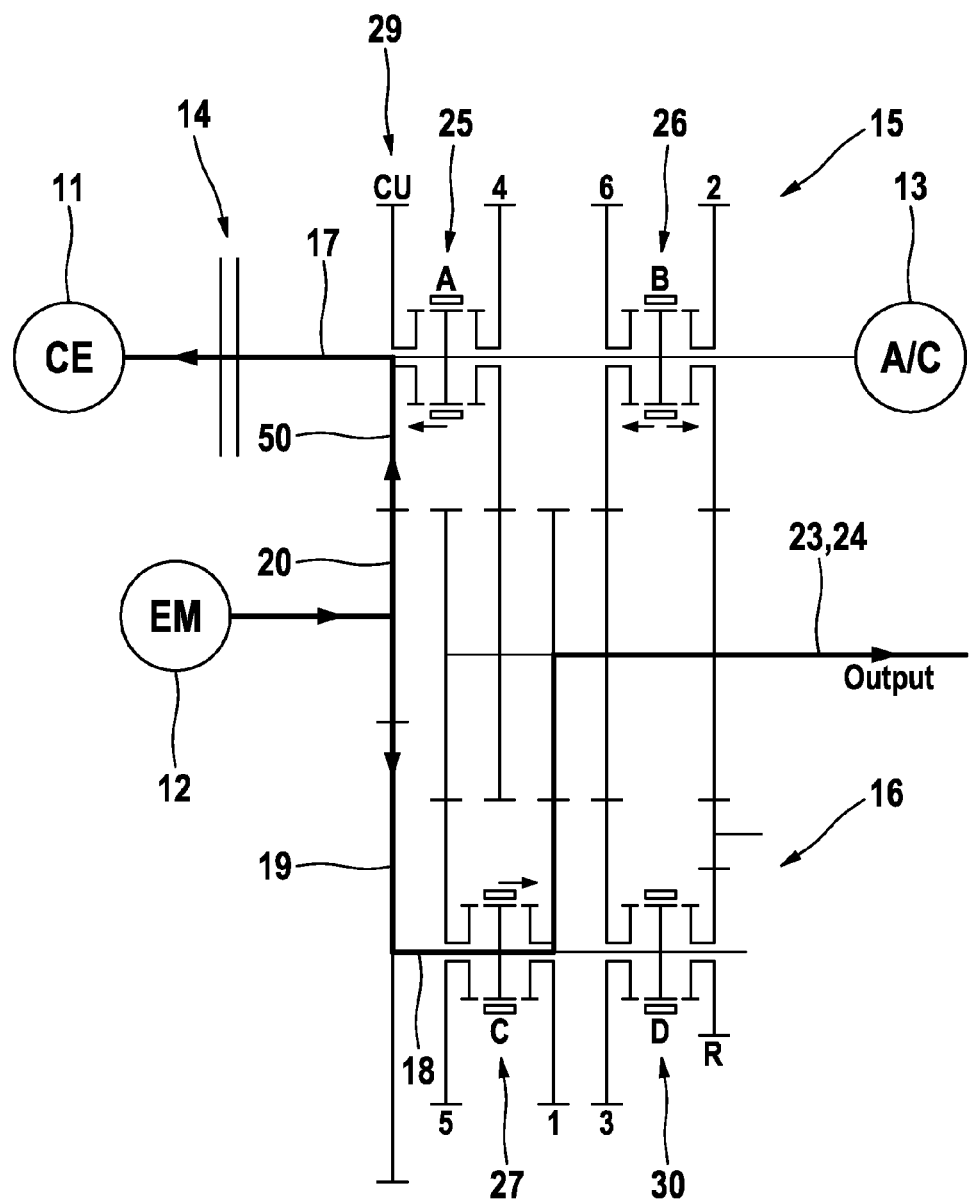
FIG. 19 shows the drive concept according to FIG. 17 when starting the internal combustion engine CE by the electric motor EM while the vehicle is driven electrically.

FIG. 19 shows the internal combustion engine 11 being started by the electric machine during electric driving of the vehicle. The first gear is engaged by the switching unit 27, so that torque flows from the electric machine 12 via the pair of gearwheels of the first gear to the output shaft 23, 24 of the drive, whereas at the same time the coupling unit 29 is engaged and the friction clutch 14 is closed in order to start the internal combustion engine 11 in the torque flow via the input shafts 17 and the friction clutch 14. Dark lines show the torque flow from the electric machine 12 to the internal combustion engine 11 and to the output shaft 23, 24.

The following switched conditions apply:
torque from the electric machine EM
switching unit CU engaged
clutch Cl closed
first gear engaged.

Figure 20:
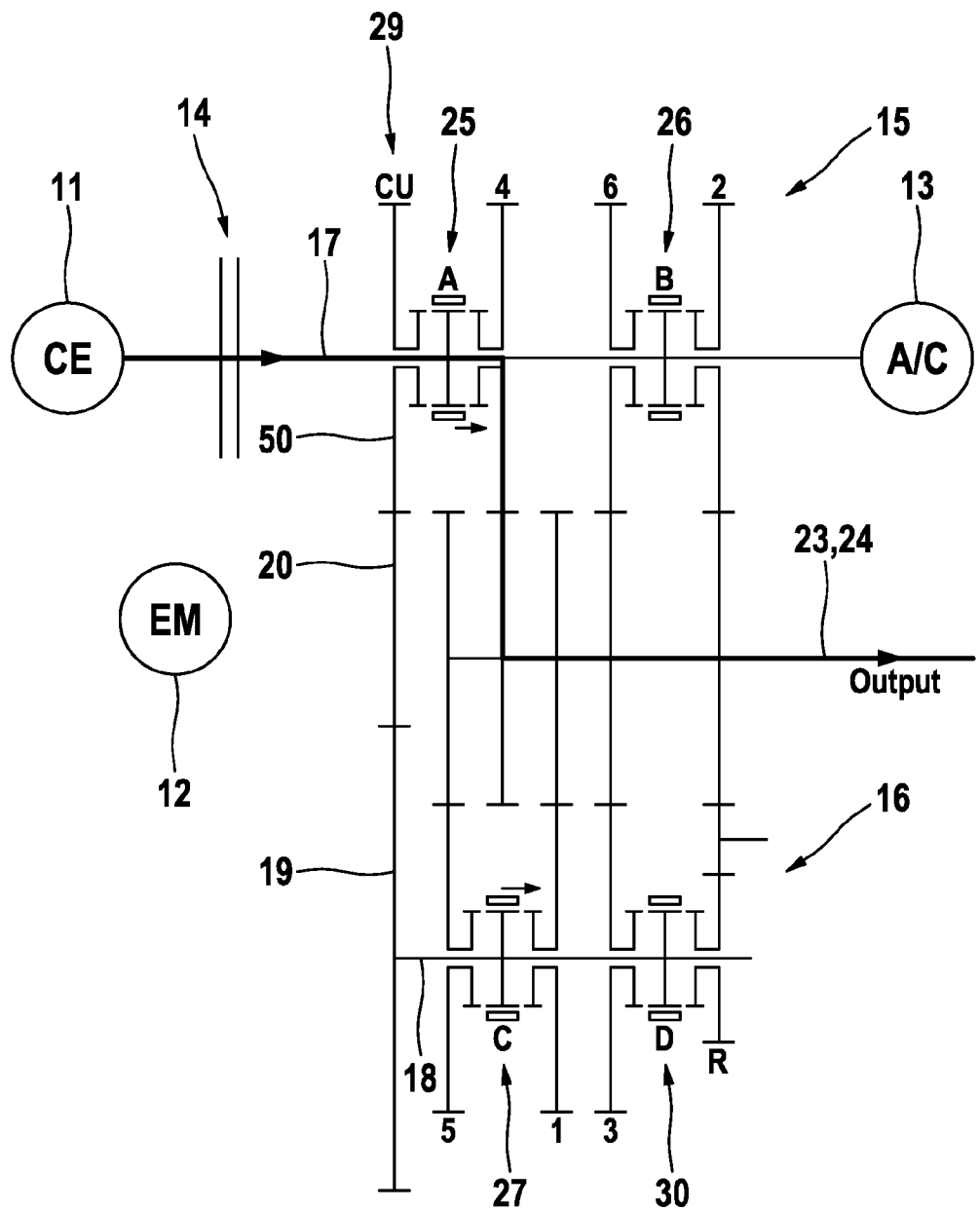
FIG. 20 shows the drive concept according to FIG. 17 when driving with the internal combustion engine CE.

FIG. 20 shows the state of driving with the internal combustion engine. The fourth gear is engaged by the switching unit 25. A darker line shows the torque flow from the internal combustion engine to the output shaft 23, 24. The coupling unit 29 is to be engaged and the friction clutch 14 is to be closed. To use the gears 1, 3 and 5 by means of the switching units 27, 30 whereas the coupling unit 29 is to be disengaged and the friction clutch is to be closed to use the gears 2, 4 and 6 by means of the switching units 25, 26.

The following switched conditions apply:
torque flow from the internal combustion engine CE
coupling unit CU engaged
clutch Cl closed
forth gear engaged.

Figure 21:
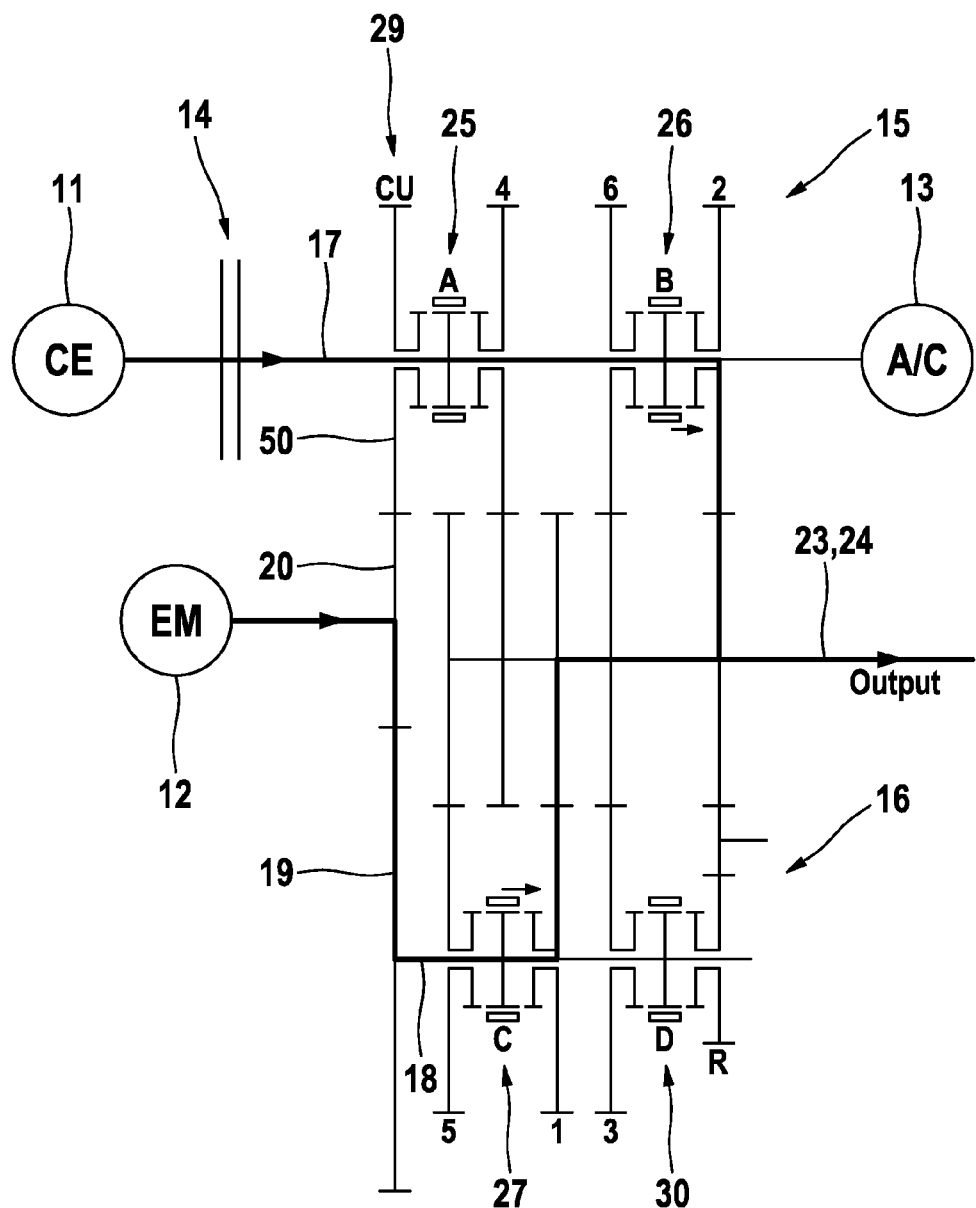
FIG. 21 shows the drive concept according to FIG. 17 in the boost mode (internal combustion engine CE in the first, the third or the fifth gear).

FIG. 21 show the vehicle driving in the boost mode, i.e. both driving machines 11, 12 provide torque. In FIG. 21, the combustion engine 11, with the clutch 14 being in the closed condition, is coupled to the output gearwheel 28 by means of the gearwheels of the second gear which is engaged by the switching unit 26. At the same time, the electric machine 12 is coupled to the output shaft 23, 24 with the first gear being engaged by the switching unit 27. The coupling unit 29 is disengaged. The boost condition shown here can be set in the same way by engaging gears 4 and 6 of the first partial drive 15 or by engaging the coupling unit 29. The torque flow takes place from the internal combustion engine 11 via the shaft 17 to the output shaft 23, 24 and from the electric machine 12 via the input shaft 18 to the output shaft 23, 24.

The switched conditions are as follows:
torque from the internal combustion engine CE
friction clutch Cl closed
torque from the electric machine EM
coupling unit CU disengaged
second gear engaged
first gear engaged.

In all modes of the first partial drive 15 mentioned above the second partial drive 16 can alternatively being used for the boost mode in the first, third or fifth gear.

The illustrations of FIG. 22 show different phases of changing up from the second into the third gear.

Figure 22A:
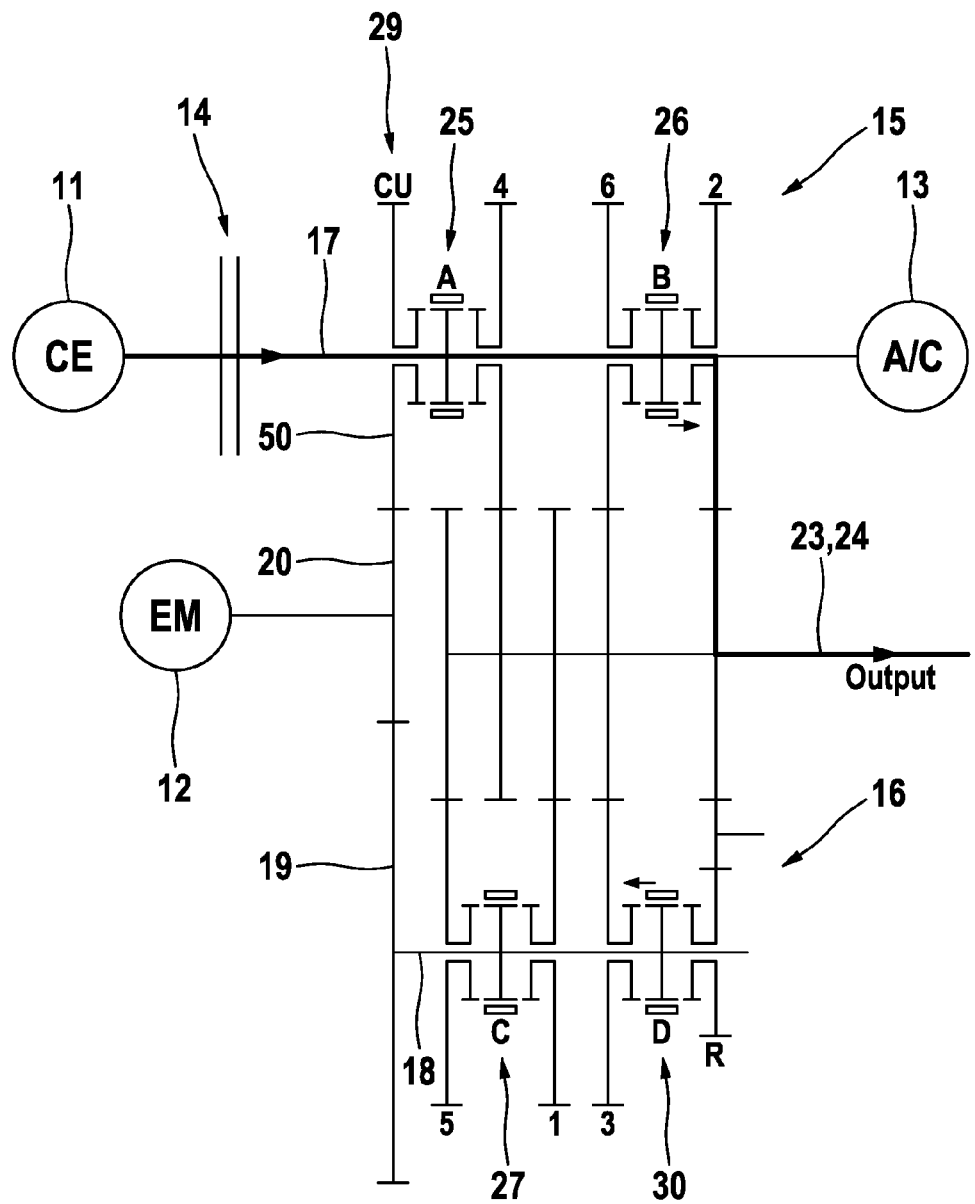
FIG. 22a shows the drive concept according to FIG. 17 when changing up from the second gear to the third gear during a first phase.

In FIG. 22a the friction clutch 14 is closed and the coupling unit 29 is engaged. Furthermore, the second gear is engaged by the switching unit 26. Torque flows from the internal combustion engine 11 via the input shaft 17 and the pair of gearwheels of the second gear to the output shaft 23, 24, so that the vehicle can be driven by the internal combustion engine. There is indicated an additional torque flow from the electric machine via the pair of gearwheels 20, 19 to the input shaft 18. The third gear is already engaged by means of the switching unit 30 This is the so-called boost mode in which additional torque is applied by the electric machine. The latter could also run in a torque-free condition. However, in the present case, the boost mode forms part of the switching process which follows. Covered lines indicate the torque flow from the internal combustion engine 11 and from the electric machine to the output gearwheel 28.

The following switched conditions apply:
torque from the internal combustion engine CE
clutch Cl closed
coupling unit CU disengaged
additional torque from the electric machine EM
second gear engaged,
third gear engaged.

Figure 22B:
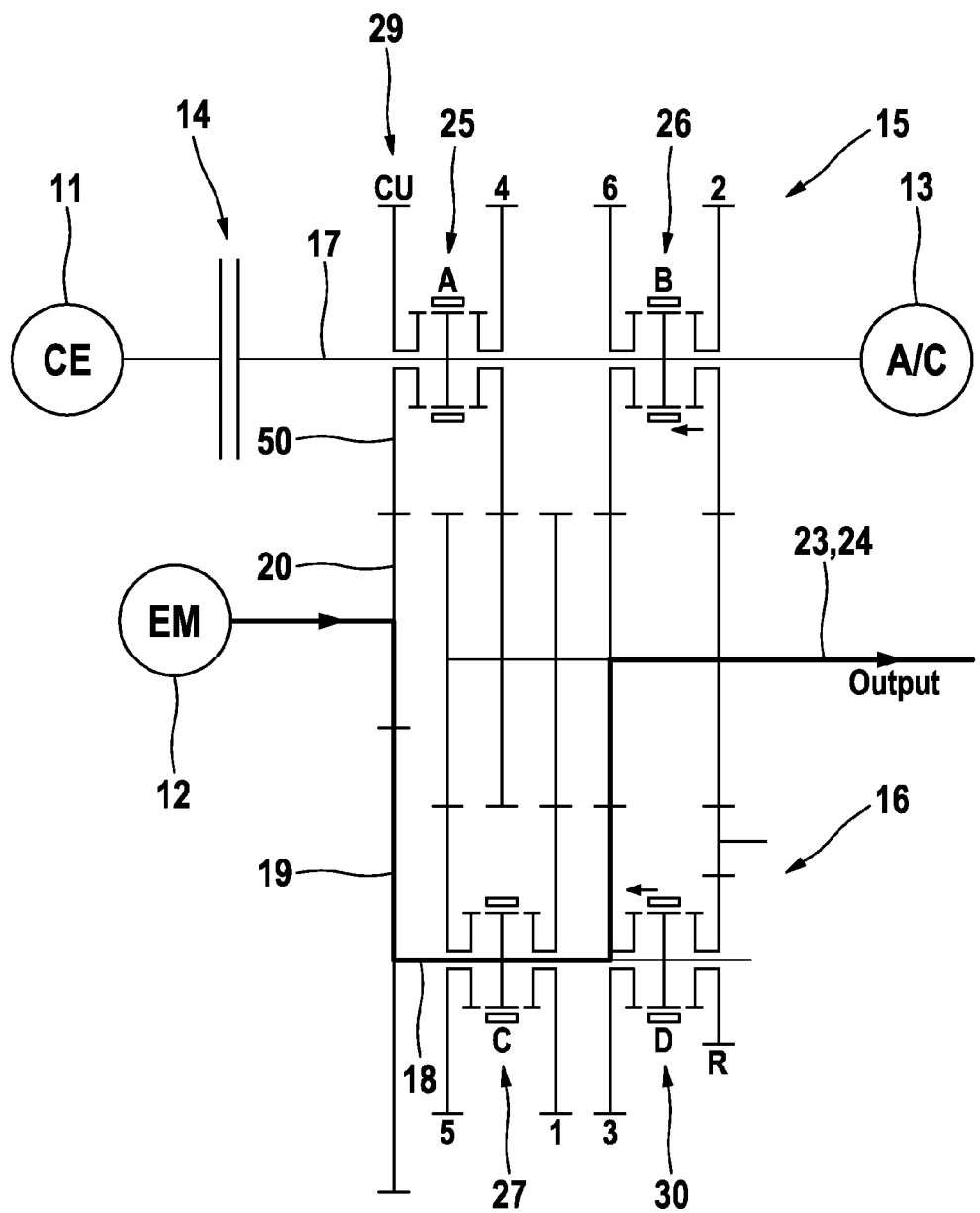
FIG. 22b shows the drive concept according to FIG. 17 when changing up from the second gear to the third gear during a second phase.

In FIG. 22b, the second gear is still engaged, but the friction clutch 14 is opened in order to separate the internal combustion engine 11 from the input shaft 17 and render it torque-free. Hereafter, the second gear is disengaged by the switching unit 26. A thickened line indicates the torque flow from the electric machine to the output shaft 23, 24.

The following switched conditions apply:
torque from the electric machine EM
clutch Cl open
coupling unit CU disengaged
second gear disengaged.

Figure 22C:
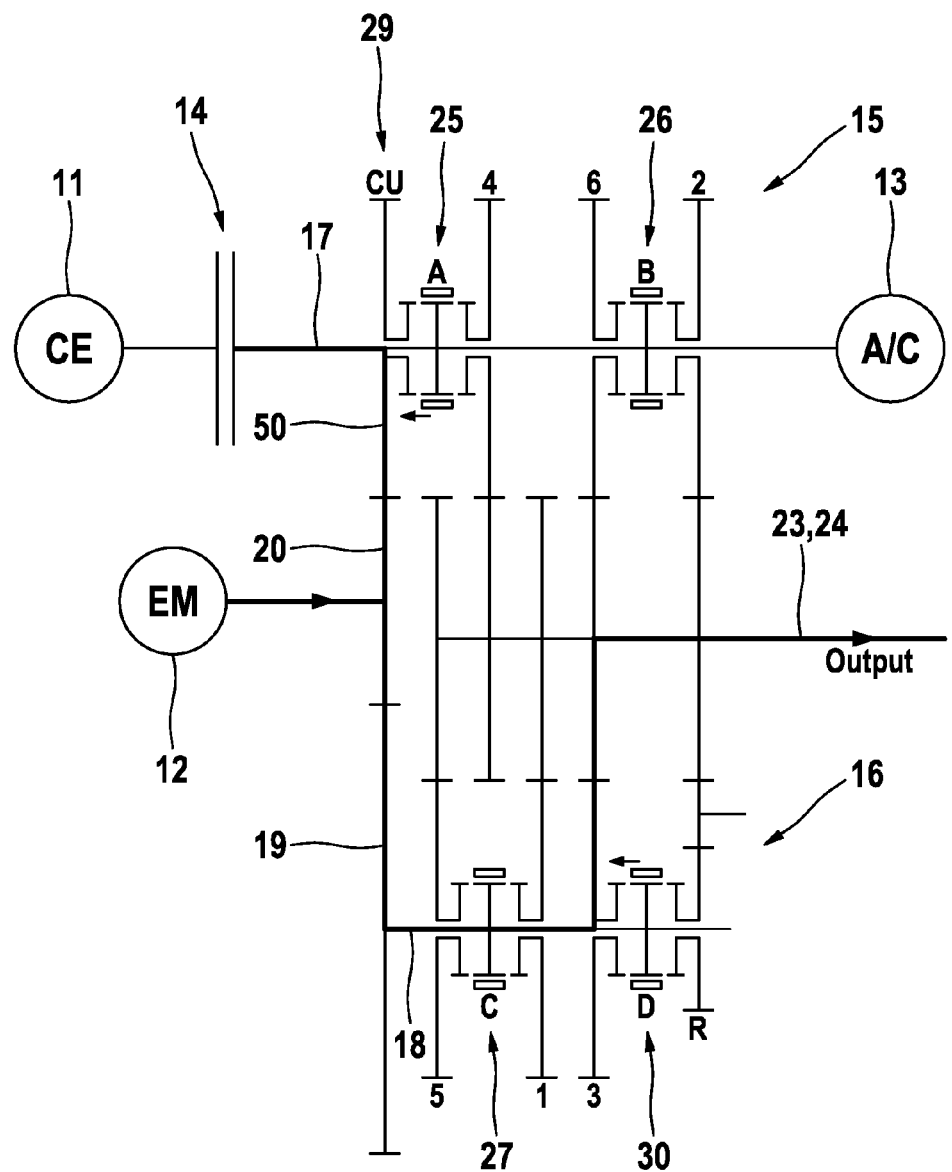
FIG. 22c shows the drive concept according to FIG. 17 when changing up from the second gear to the third gear during a third phase.

FIG. 22c shows that the coupling unit 29 is engaged by the switching unit 25, to connect the input shaft 17 via the input shaft 18 to the output shaft 23, 24. The input shaft 17 continues to be torque-free because the friction clutch 14 continues to be open. The torque flow takes place from the electric machine 12 via the input shaft 18 to the output shaft 23, 24.

The switched conditions are as follows:
torque from the electric machine EM
clutch Cl open
coupling unit CU engaged
second gear disengaged
third gear already engaged.

Figure 22D:
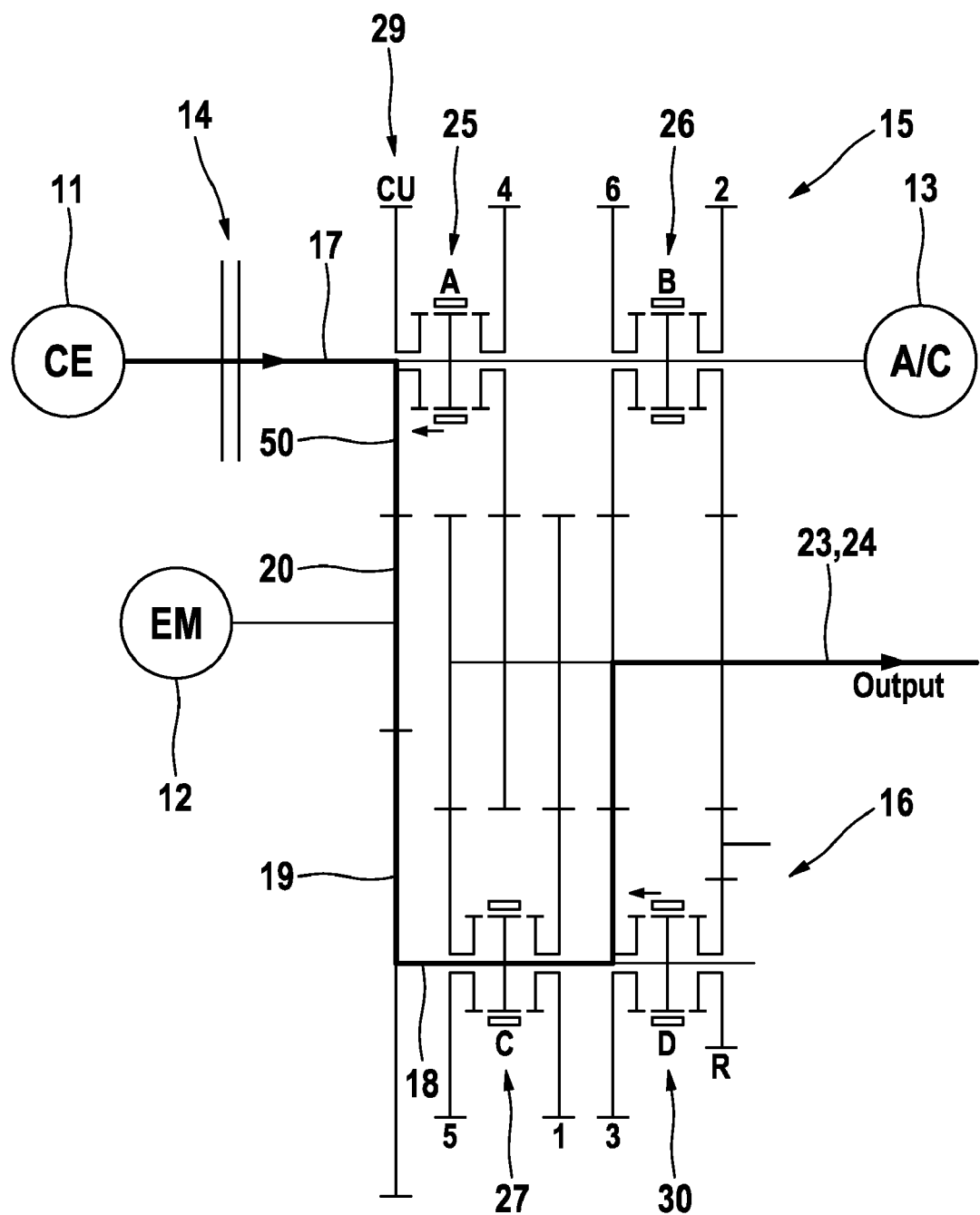
FIG. 22d shows the drive concept according to FIG. 17 when changing up from the second gear to the third gear during a fourth phase.

FIG. 22d shows how the switching process is concluded by closing the friction clutch 14. The gearwheels of the already engaged third gear are incorporated in the torque flow from the internal combustion engine 11 via the input shaft 17 and the input shaft 18 to the output shaft 23, 24. A thickened line indicates the torque flow from the internal combustion engine to the output shaft 23, 24.

The switched conditions are as follows:
torque from the internal combustion engine CE,
clutch Cl closed
coupling unit CU engaged
second gear disengaged
third gear engaged.

Figure 23:
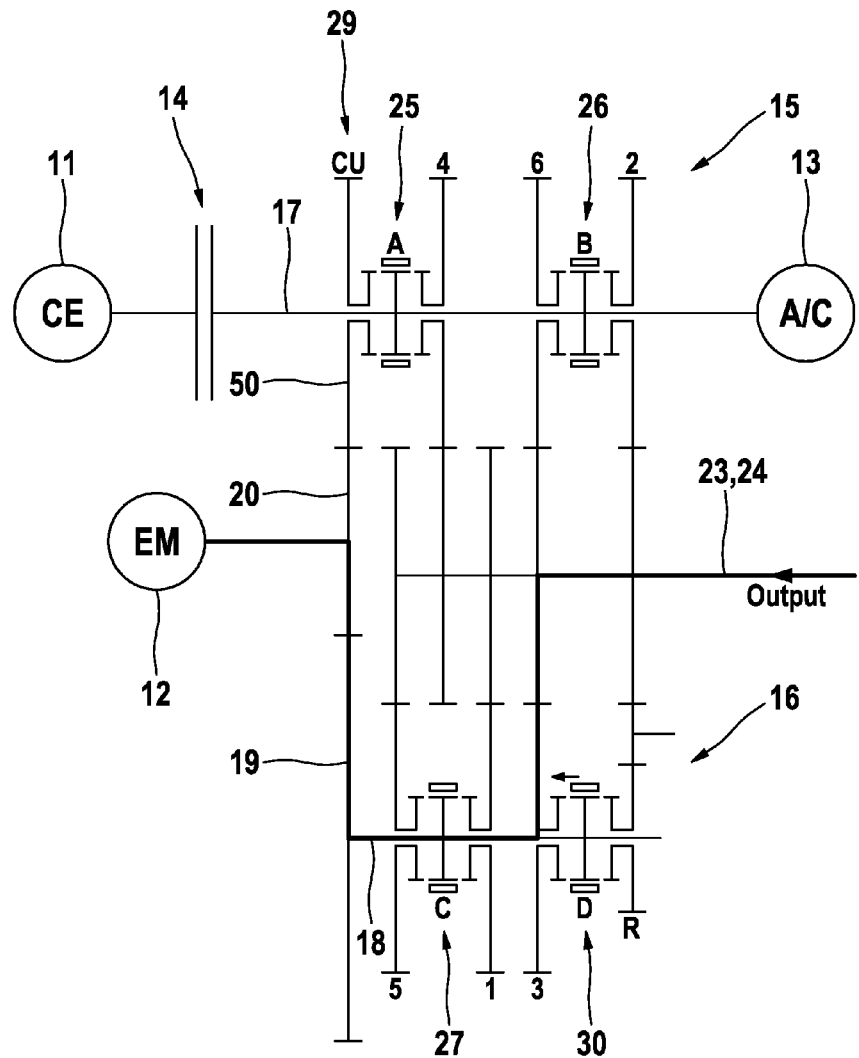
FIG. 23 shows the drive concept according to FIG. 17 in the recuperation mode (first, third or fifth gear).

FIG. 23 shows the switched condition in the recuperation mode, i.e. when the vehicle is being pushed, using the third gear. The switching gearwheel of the third gear is coupled by the switching unit 30 to the output shaft 23, 24, so that torque flows from the output shaft 24, 23 to the input shaft 18. The coupling unit 29 has to be disengaged so that torque is transmitted from the input shaft 18 to the electric machine 12 which is generator-operated. A thickened line symbolises the torque flow from the output shaft 23, 24 to the electric machine 12.

The switched conditions are as follows:
torque to the electric machine EM
friction clutch Cl open
coupling unit CU disengaged
third gear engaged.

At the recuperation mode can be alternatively being used in the first, third or fifth gear of the second partial drive 16, when the coupling unit 29 is disengaged, or in the second or sixth gear of the first partial drive 15, when the coupling unit 29 is engaged.

Figure 24:
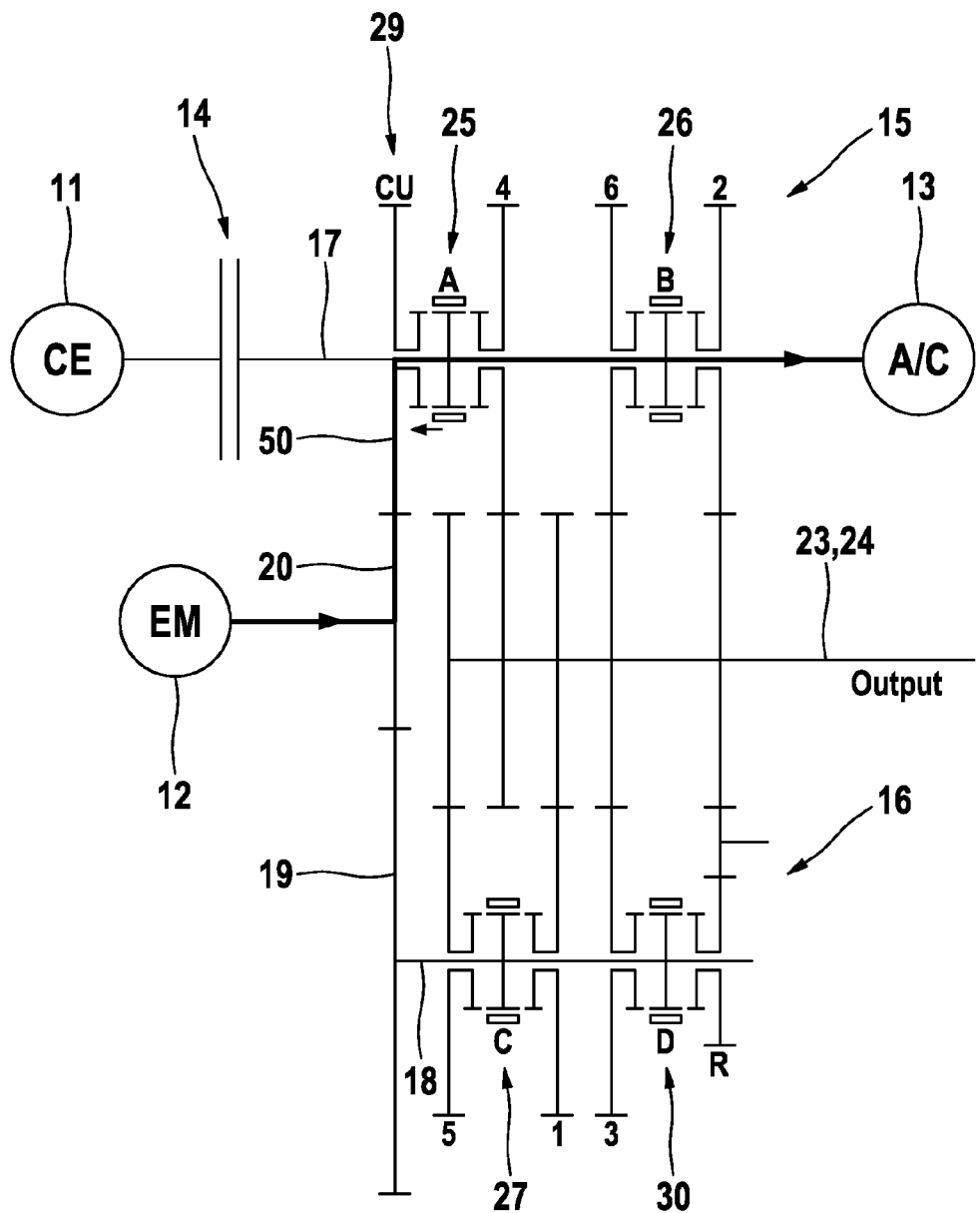
FIG. 24 shows the drive concept according to FIG. 17 when the vehicle is the stationary condition and driving a compressor.

FIG. 24 shows an auxiliary driven machine, i.e. the air conditioner compressor 13, being operated by the electric machine 12 when the vehicle is stationary. The friction clutch 14 is open whereas the coupling unit 29 is engaged. The switching units 26, 27 and 30 are in the neutral position. The thickened line symbolises the torque flow from the electric machine 12 to the air conditioner compressor 13.

The switched conditions are as follows:
torque from the electric machine EM
friction clutch Cl open
coupling unit CU engaged.

With the coupling unit 29 being disengaged, any combination of one of the second, forth or sixth gear of the first partial drive 15 and any one of the first, third or fifth gear of the second partial drive 16 can be used to drive the compressor 13 from the electric machine 12.

The invention claimed is:

1. A method of operating a hybrid drive system with a main driving machine (11) and a supplementary driving machine (12) for a motor vehicle, comprising:
    a first gear changing partial drive (15) with an input shaft (17) and an output shaft (23) and a first group of gear changing pairs of gearwheels each having a gearwheel connected in a rotationally fast way to its shaft and a switching gearwheel which can be switchably coupled to its shaft and whose input shaft (17) can be coupled to the main driving machine (11);
    a second gear changing partial drive (16) with an input shaft (18) and an output shaft (24) and a second group of gear changing pairs of gearwheels each having a gearwheel connected in a rotationally fast way to its shaft and a switching gearwheel which can be switchably coupled to its shaft and whose input shaft (18) is connectable in respect of drive to the supplementary driving machine (12);
    wherein the two input shafts (17, 18) can be connected to one another in a rotationally fast way via a coupling unit (29),
    characterised in
    that, during operation by means of the main driving machine (11) only there is effected a gear change between two gears adjoining one another in the gear changing sequence by changing the torque flow from one gear changing partial drive to the other gear changing partial drive.

2. A method according to claim 1,
    characterised in
    that during operation by means of the supplementary driving machine only there is effected a gear change between two gears adjoining one another in the gear changing sequence by changing the torque flow from one gear changing partial drive to the other gear changing partial drive.

3. A hybrid drive system with a main driving machine (11) and a supplementary driving machine (12) for a motor vehicle, comprising:
- a first gear changing partial drive (15) with an input shaft (17) and an output shaft (23) and a first group of gear changing pairs of gearwheels each having a gearwheel connected in a rotationally fast way to its shaft and a switching gearwheel which can be switchably coupled to its shaft and whose input shaft (17) can be coupled to the main driving machine (11);
- a second gear changing partial drive (16) with an input shaft (18) and an output shaft (24) and a second group of gear changing pairs of gearwheels each having a gearwheel connected in a rotationally fast way to its shaft and a switching gearwheel which can be switchably coupled to its shaft and whose input shaft (18) is connectable in respect of drive to the supplementary driving machine (12);
- wherein the pairs of gear changing gearwheels, in the gear changing sequence, are alternately associated with one of the gear changing partial drives (15, 16) and wherein the two input shafts (17, 18) can be connected to one another in a rotationally fast way via a coupling unit (29).

4. A hybrid drive system according to claim 3, characterised in
that the main driving machine (11) can be coupled via a friction coupling (14) to the first input shaft (17).

5. A hybrid drive system according to claim 3, characterised in
that the supplementary driving machine (12) is coupled via a gearwheel (20) to a gearwheel (19) firmly arranged on the second input shaft (18), wherein the gearwheels (20, 19) form a transmission stage.

6. A hybrid drive system according to claim 3, characterised in
that an auxiliary driven machine (13) is coupled via a gearwheel (21) to a gearwheel (19) firmly arranged on the second input shaft (18), wherein the gearwheels (21, 19) form a transmission stage.

7. A hybrid drive system according to claim 3, characterised in
that the two input shafts (17, 18) are arranged coaxially and can be coupled to one another via a coaxially arranged coupling unit (29).

8. A hybrid drive system according to claim 7, characterised in
that the two output shafts (23, 24) are integrally connected to one another.

9. A hybrid drive system according to claim 3, characterised in
that the two input shafts (17, 18) are arranged in parallel relative to one another and that the coupling unit (29) is arranged on one of the input shafts and acts on a switching gearwheel (50) which is arranged on said input shaft and which forms a pair of gearwheels with a gearwheel (45) firmly arranged on the other input shaft.

10. A hybrid drive system according to claim 9, characterised in
that the two output shafts (23, 24) are arranged in parallel relative to their input shaft (17, 18) and are coupled via fixed gearwheels ($22_1$, $22_2$) to an individual output gearwheel (28).

11. A hybrid drive system according to claim 3, characterised in
that the two input shafts (17, 18) are arranged in parallel relative to one another and that the coupling unit (29) is arranged on one of the input shafts and acts on a switching gearwheel (50) which is arranged on said input shaft and which forms a gear train with a gearwheel (20) firmly arranged on the other input shaft, especially via an intermediate gearwheel (19) connected to the supplementary driving machine (12).

12. A hybrid drive system according to claim 11, characterised in
that the two output shafts (23, 24) form one integral shaft member.

13. A hybrid drive system according to claim 3, characterised in
that the first gear changing partial drive (15) comprises at least a first gear and a third gear, and that the second gear changing partial drive (16) comprises at least a second gear and a fourth gear.

14. A hybrid drive system according to claim 13, characterised in
that the first gear changing partial drive (15) comprises a fifth gear and a reverse gear and that the second gear changing partial drive (16) comprises a sixth gear.

* * * * *

UNITED STATES PATENT AND TRADEMARK OFFICE
CERTIFICATE OF CORRECTION

| | |
|---|---|
| PATENT NO. | : 8,257,221 B2 |
| APPLICATION NO. | : 12/051954 |
| DATED | : September 4, 2012 |
| INVENTOR(S) | : Werner Leufgen |

It is certified that error appears in the above-identified patent and that said Letters Patent is hereby corrected as shown below:

On the Title Page:

Item (73) Assignee – Delete "Fev Motorentechnik GmbH", Insert --FEV GMBH--

Signed and Sealed this
Fifth Day of May, 2015

Michelle K. Lee
*Director of the United States Patent and Trademark Office*